(12) United States Patent
Guan et al.

(10) Patent No.: US 11,933,616 B2
(45) Date of Patent: Mar. 19, 2024

(54) SIMULTANEOUS LOCALIZATION AND MAPPING USING ROAD SURFACE DATA

(71) Applicant: Shenzhen Gudsen Technology Co., LTD, Shenzhen (CN)

(72) Inventors: Chenyong Guan, Shenzhen (CN); Yu Jiang, Wellesley, MA (US)

(73) Assignee: Shenzhen Gudsen Technology Co., LTD, Shenzhen (CN)

(*) Notice: Subject to any disclaimer, the term of this patent is extended or adjusted under 35 U.S.C. 154(b) by 0 days.

(21) Appl. No.: 18/131,589

(22) Filed: Apr. 6, 2023

(65) Prior Publication Data
US 2023/0258457 A1 Aug. 17, 2023

Related U.S. Application Data

(63) Continuation of application No. PCT/CN2020/120350, filed on Oct. 12, 2020.

(51) Int. Cl.
*G01C 21/30* (2006.01)
(52) U.S. Cl.
CPC .................................. *G01C 21/30* (2013.01)
(58) Field of Classification Search
CPC ... G01C 21/30; B60W 40/06; B60W 2552/20; B60W 2552/25; B60W 2552/35
See application file for complete search history.

(56) References Cited

U.S. PATENT DOCUMENTS

| 7,421,334 | B2 | 9/2008 | Dahlgren et al. |
| 9,224,293 | B2 | 12/2015 | Taylor |
| 2001/0039784 | A1 | 11/2001 | Mcmahon et al. |
| 2007/0216521 | A1 | 9/2007 | Guensler et al. |
| 2014/0300732 | A1* | 10/2014 | Friend ................... G06T 7/73 348/135 |
| 2018/0273045 | A1* | 9/2018 | Herrera ............... B60W 40/11 |
| 2019/0079539 | A1 | 3/2019 | Sridhar et al. |
| 2021/0180987 | A1* | 6/2021 | Terada ................. H04W 4/029 |
| 2022/0065657 | A1* | 3/2022 | Wang .................. G01S 13/931 |
| 2022/0082705 | A1* | 3/2022 | Graves ................. G01C 21/16 |

OTHER PUBLICATIONS

Dean et al, "Terrain-Based Road Vehicle Localization On Multi-Lane Higheays", 2009 American Control Conference, Hyatt Regency Riverfront St. Louis MO Jun. 10-12, 2009, pp. 707-712.

(Continued)

*Primary Examiner* — Abby Y Lin
*Assistant Examiner* — Danielle M Jackson
(74) *Attorney, Agent, or Firm* — Foley & Lardner LLP

(57) ABSTRACT

Systems, methods, and apparatuses for vehicle localization. The vehicle can include a data processing system ("DPS") including one or more processors and memory. The DPS can receive sensor data from sensors of the vehicle. The DPS can identify a historical road profile of the ground for a first location of the vehicle. The DPS can generate a current road profile of the ground. The DPS can determine a lateral deviation of the vehicle. The DPS can determine a match between the historical road profile and the current road profile at a second location that aligns with the lateral deviation. The DPS can provide an indication of a current location of the vehicle as the second location.

20 Claims, 11 Drawing Sheets

(56) References Cited

OTHER PUBLICATIONS

Dean et al., "Terrain-Based Road Vehicle Localization Using Particle Filters", Vehicle Systems Dynamics, vol. 00 No. 00 Jan. 2010, 1-14.
Gim et al, "IMU-Based Virtual Road Profile Sensor for Vehicle Localization", School of Mechanical Engineering, Pusan National University published Oct. 7, 2018.
International Search Report and Written Opinion issued on PCT PCT/CN2020/120350 dated May 27, 2021.

\* cited by examiner

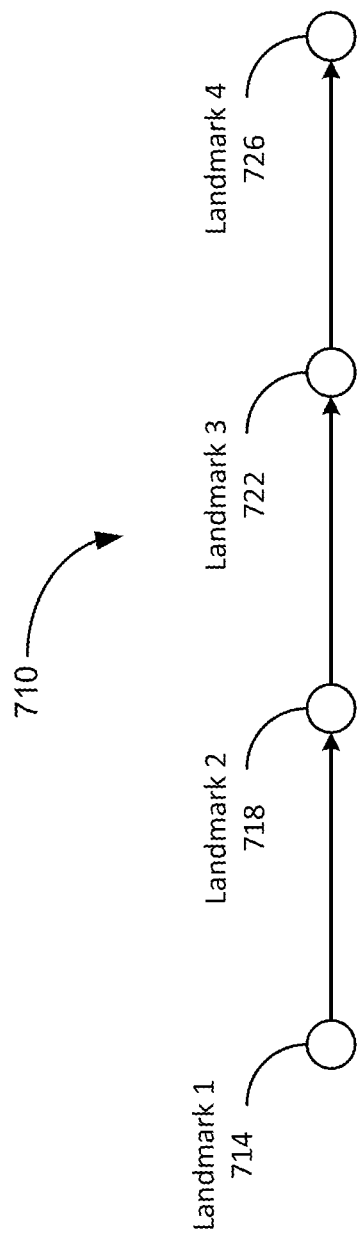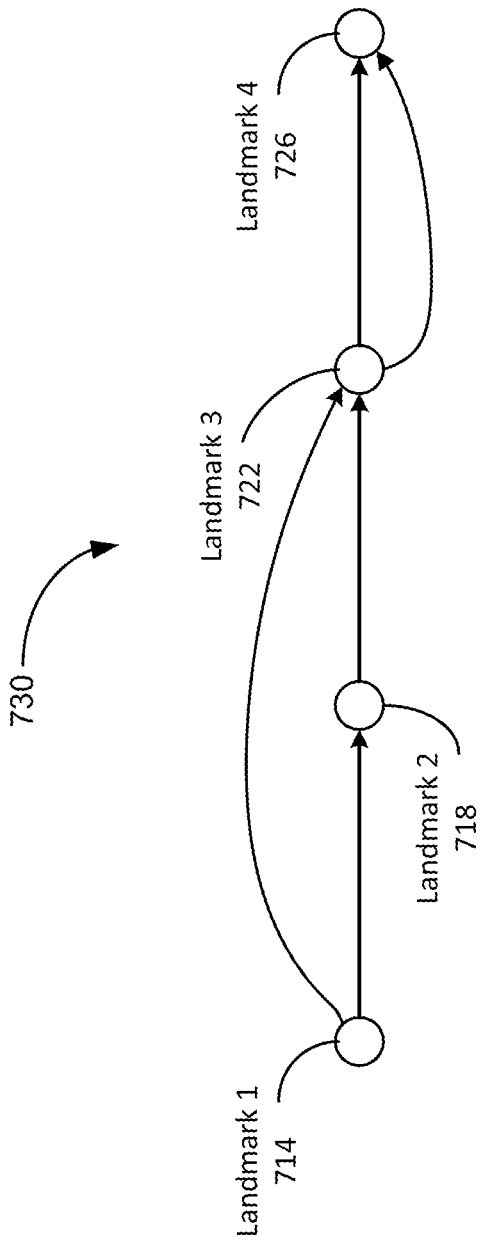

US 11,933,616 B2

SIMULTANEOUS LOCALIZATION AND MAPPING USING ROAD SURFACE DATA

CROSS-REFERENCE TO RELATED APPLICATIONS

The present application claims the benefit of priority under 35 U.S.C. § 120 as a continuation of International Application No. PCT/CN2020/120350 filed Oct. 12, 2020, the entire contents of which are incorporated herein by reference.

BACKGROUND

Vehicles can be equipped with global positioning systems to locate the vehicles on the road. The global positioning systems control systems can receive signals from satellites indicating the location of the satellite. The global positioning systems can calculate distances from the satellites to determine an approximate location of a vehicle.

SUMMARY

This technical solution is directed to systems, methods, and apparatus of simultaneous localization and mapping using road surface data. Due to the technical challenges of localizing the position of the vehicle, the positioning system of the vehicle may provide an inaccurate or outdated location data of the vehicle due to satellite signal latencies, alteration in vehicle acceleration and velocity, and reception of the satellite signals. Further, the resolution of the location based on a satellite position system may not be sufficient for certain advanced driver-assistant systems and applications. This technical solution, by generating real-time road profile data and matching to previously recorded road profile data, can improve the precision with which the location of a vehicle is determined. These road profile data can be generated by the vehicles based on recorded road height information or vehicle height information. Indeed, vehicles can travel in areas where a global positioning system ("GPS") (e.g., navigation system) of the vehicles are not able to receive the satellite signals or where signals are likely to be refracted or reflected. For example, a navigation system of a vehicle may receive satellite signals indicating a location of the vehicle before entering a tunnel. Once entered, satellite signals may not reach the vehicle, thus, the location of the vehicle may not be determined via the navigation system. Accordingly, the location of the vehicle may be inaccurate, delayed, or compromised altogether if solely relying on location information from satellite signals.

Systems, methods, and apparatus of this technical solution provide road profile generation and mapping to improve the localization of vehicles. For instance, by comparing and matching an expected road profile (e.g., one or more previously generated road profiles by at least one vehicle) with live reconstructed road profile (e.g., live road profile or current road profile) generated by each vehicle, the vehicle can localize itself. Indeed, the vehicle can determine its location based on historical road profiles associated with a location on the road. The localization can be performed by a data processing system ("DPS") of each vehicle. The vehicle can include one or more sensors to receive consistent signals, e.g., vehicle motion at nominal speed. The vehicle can include at least a fingerprint generator (e.g., road profile generator), a live buffer (e.g., domain transformer), a map manager, and a localization engine (e.g., terrain comparator). The vehicle can generate consistent signals that only depends on the road. The vehicle can covert data from time-domain data to distance-domain data. The time-domain data may be referred to as a temporal domain, and the distance-domain data may be referred to as a spatial domain. The vehicle can retrieve or load map data including collections of expected landmarks (e.g., snippets of fingerprints) with their associated location on the road. The map manager can send the landmarks corresponding to an estimated location of the vehicle to the terrain comparator. Accordingly, the vehicle can compare a current road profile generated by the road profile generator to a historical road profile associated with the landmarks. Therefore, by comparing the current road profile with the historical road profile associated with a location on the road, the vehicle can localize itself, in some cases, without relying on external signals to compute the location of the vehicle, thereby reducing latency in updating vehicle location, improving localization accuracy, and reducing computational power and resource consumption.

At least one aspect is directed to a system to localize a vehicle. The vehicle can include a data processing system including one or more processors and memory. The data processing system can receive, via one or more sensors on the vehicle, sensor data comprising a plurality of vertical displacement signals indicating vertical displacement between a body of the vehicle and a ground on which the vehicle traverses. The data processing system can identify, for a first location of the vehicle, a historical road profile of the ground indicative of vertical displacements between the body of the vehicle and the ground at a plurality of locations including the first location. The data processing system can generate a current road profile of the ground based on the sensor data comprising the plurality of vertical displacement signals. The data processing system can determine, based on lateral displacement data received via the one or more sensors, a lateral deviation of the vehicle. The data processing system can determine a match between the historical road profile and the current road profile at a second location subsequent to the first location that aligns with the lateral deviation. The data processing system can provide, responsive to the match, an indication of a current location of the vehicle as the second location stored in the historical road profile that aligns with the lateral deviation.

The data processing system can convert, via a buffer on the vehicle, the current road profile from the temporal domain to the spatial domain using (i) the plurality of vertical displacement signals of the current road profile, (ii) a plurality of timestamps corresponding to the plurality of vertical displacement signals, and (iii) longitudinal velocity data of the vehicle received via the one or more sensors. The data processing system can compare, responsive to converting the current road profile from the temporal domain to the spatial domain, the historical road profile with the current road profile in the spatial domain at the second location that aligns with the lateral deviation to determine the match. The one or more sensors can include an inertial measurement unit ("IMU") located at a distal end, proximal end, or between the distal end and the proximal end of a longitudinal axis of the vehicle, a plurality of range sensors located on a lateral axis of the vehicle with the IMU, and a location sensor, where the sensor data can include longitudinal velocity data, vertical velocity data, and angular velocity data.

The data processing system can generate the current road profile of the ground based on the longitudinal velocity data, the vertical velocity data, and the angular velocity data. The data processing system can determine the first location of the vehicle based on the location data. The one or more sensors can include a plurality of acceleration sensors located at the top and the bottom of each suspension of the vehicle. The data processing system can determine, via the plurality of acceleration sensors, suspension dynamic data of the vehicle. The data processing system can normalize the plurality of vertical displacement signals of the current road profile based on the suspension dynamic data of the vehicle. The data processing system can compare the historical vertical displacements of the historical road profile with the normalized vertical displacement signals of the current road profile at the second location that aligns with the lateral deviation. The sensor data further include roll angular velocity data and pitch angular velocity data further utilized to generate the current road profile.

The data processing system can normalize the vertical velocity data and the angular velocity data associated with the longitudinal velocity data to a predetermined velocity. The data processing system can generate the current road profile of the ground based on the sensor data including the longitudinal velocity data, the vertical velocity data normalized to the predetermined velocity, the angular velocity data normalized to the predetermined velocity, and the plurality of vertical displacement signals. The data processing system can determine a trajectory of the vehicle based on location data of the vehicle received from the one or more sensors. The data processing system can determine, based on the first location of the vehicle and the trajectory of the vehicle, the vehicle approaches a plurality of landmarks corresponding to the plurality of locations. The data processing system can retrieve, via a map manager, the historical road profile of the ground comprising the plurality of landmarks, the historical road profile, and the plurality of landmarks generated by a plurality of vehicles using second sensor data.

The data processing system can provide, responsive to determining the match between the historical road profile and the current road profile, the indication of the current location of the vehicle comprising the location index and the lane identifier to an interface of the vehicle to cause the interface to display the vehicle at the current location and the lane. The data processing system can determine, using longitudinal velocity data received from the one or more sensors of the vehicle, a travel distance of the vehicle from the current location, the travel distance indicative of the vehicle approaching the second landmark at the predetermined distance from the first landmark. The data processing system can provide the historical vertical displacements of the historical road profile at the second landmark to a controller of the vehicle to cause the controller to control a component of the vehicle based on the historical vertical displacements of the historical road profile at the second landmark. The data processing system can generate, responsive to the vehicle at the predetermined distance from the current location associated with a first landmark, a second landmark associated with a second plurality of vertical displacement signals received from the one or more sensors, the second landmark located at the predetermined distance subsequent to the current location. The data processing system can update, using the second plurality of vertical displacement signals at the second landmark, the plurality of landmarks with the second landmark, and the historical vertical displacements of the historical road profile at the second landmark.

The data processing system can compare the historical vertical displacements of the historical road profile to the plurality of vertical displacement signals of the current road profile at the first landmark that aligns with the lateral deviation. The data processing system can determine a score indicative of similarities between the historical road profile and the current road profile at the first landmark that aligns with the lateral deviation. The data processing system can update, responsive to the score satisfying a similarity threshold, the historical vertical displacements of the historical road profile at the first landmark using the plurality of vertical displacement signals received at the first landmark; or remove, responsive to the score not satisfying the similarity threshold, the first landmark from the plurality of landmarks of the historical road profile. The data processing system can provide, to an interface of the vehicle, the indication of the current location of the vehicle as the second location in an offline state.

At least one aspect is directed to a method of controlling components of a vehicle. The method can be performed by the vehicle including a data processing system including one or more processors and memory. The method can include receiving, via one or more sensors on the vehicle, sensor data comprising a plurality of vertical displacement signals indicating vertical displacement between a body of the vehicle and a ground on which the vehicle traverses. The method can include identifying, for a first location of the vehicle, a historical road profile of the ground indicative of vertical displacements between the body of the vehicle and the ground at a plurality of locations including the first location. The method can include generating a current road profile of the ground based on the sensor data comprising the plurality of vertical displacement signals. The method can include determining, based on lateral displacement data received via the one or more sensors, a lateral deviation of the vehicle. The method can include determining a match between the historical road profile and the current road profile at a second location subsequent to the first location that aligns with the lateral deviation. The method can include providing, responsive to the match, an indication of a current location of the vehicle as the second location stored in the historical road profile that aligns with the lateral deviation.

The method can include converting, via a buffer on the vehicle, the current road profile from the temporal domain to the spatial domain using (i) the plurality of vertical displacement signals of the current road profile, (ii) a plurality of timestamps corresponding to the plurality of vertical displacement signals, and (iii) longitudinal velocity data of the vehicle received via the one or more sensors. The method can include comparing, responsive to converting the current road profile from the temporal domain to the spatial domain, the historical road profile with the current road profile in the spatial domain at the second location that aligns with the lateral deviation to determine the match. The one or more sensors can include an inertial measurement unit ("IMU") located at a distal end, proximal end, or between the distal end and the proximal end of a longitudinal axis of the vehicle, a plurality of range sensors located on a lateral axis of the vehicle with the IMU, and a location sensor, where the sensor data can include longitudinal velocity data, vertical velocity data, and angular velocity data.

The method can include generating the current road profile of the ground based on the longitudinal velocity data, the vertical velocity data, and the angular velocity data. The method can include determining the first location of the vehicle based on the location data. The one or more sensors can include a plurality of acceleration sensors located at the top and the bottom of each suspension of the vehicle. The method can include determining, via the plurality of acceleration sensors, suspension dynamic data of the vehicle. The method can include normalizing the plurality of vertical displacement signals of the current road profile based on the suspension dynamic data of the vehicle. The method can include comparing the historical vertical displacements of the historical road profile with the normalized vertical displacement signals of the current road profile at the second location that aligns with the lateral deviation. The sensor data further include roll angular velocity data and pitch angular velocity data further utilized to generate the current road profile.

The method can include normalizing the vertical velocity data and the angular velocity data associated with the longitudinal velocity data to a predetermined velocity. The method can include generating the current road profile of the ground based on the sensor data including the longitudinal velocity data, the vertical velocity data normalized to the predetermined velocity, the angular velocity data normalized to the predetermined velocity, and the plurality of vertical displacement signals. The method can include determining a trajectory of the vehicle based on location data of the vehicle received from the one or more sensors. The method can include determining, based on the first location of the vehicle and the trajectory of the vehicle, the vehicle approaches a plurality of landmarks corresponding to the plurality of locations. The method can include retrieving, via a map manager, the historical road profile of the ground comprising the plurality of landmarks, the historical road profile, and the plurality of landmarks generated by a plurality of vehicles using second sensor data.

The method can include providing, responsive to determining the match between the historical road profile and the current road profile, the indication of the current location of the vehicle comprising the location index and the lane identifier to an interface of the vehicle to cause the interface to display the vehicle at the current location and the lane. The method can include determining, using longitudinal velocity data received from the one or more sensors of the vehicle, a travel distance of the vehicle from the current location, the travel distance indicative of the vehicle approaching the second landmark at the predetermined distance from the first landmark. The method can include providing the historical vertical displacements of the historical road profile at the second landmark to a controller of the vehicle to cause the controller to control a component of the vehicle based on the historical vertical displacements of the historical road profile at the second landmark. The method can include generating, responsive to the vehicle at the predetermined distance from the current location associated with a first landmark, a second landmark associated with a second plurality of vertical displacement signals received from the one or more sensors, the second landmark located at the predetermined distance subsequent to the current location. The method can include updating, using the second plurality of vertical displacement signals at the second landmark, the plurality of landmarks with the second landmark, and the historical vertical displacements of the historical road profile at the second landmark.

The method can include comparing the historical vertical displacements of the historical road profile to the plurality of vertical displacement signals of the current road profile at the first landmark that aligns with the lateral deviation. The method can include determining a score indicative of similarities between the historical road profile and the current road profile at the first landmark that aligns with the lateral deviation. The method can include updating, responsive to the score satisfying a similarity threshold, the historical vertical displacements of the historical road profile at the first landmark using the plurality of vertical displacement signals received at the first landmark; or remove, responsive to the score not satisfying the similarity threshold, the first landmark from the plurality of landmarks of the historical road profile. The method can include providing, to an interface of the vehicle, the indication of the current location of the vehicle as the second location in an offline state.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 7A-B are example illustrations of landmarks mapping, in accordance with an implementation;

DETAILED DESCRIPTION

Following below are more detailed descriptions of various concepts related to, and implementations of, systems, methods, and apparatus for vehicle localization. The various concepts introduced above and discussed in greater detail below may be implemented in any of numerous ways.

This technology is directed to systems, methods, and apparatus for vehicle localization. The system can include a vehicle having a data processing system including one or more processors and memory. The vehicle can operate autonomously, semi-autonomously, or manually by an operator. The vehicle can be equipped or installed with multiple sensors to receive, collect, or otherwise sense road data, vehicle data, and other sensor data to generate a road profile. The sensors can be mounted on, attached to, or embedded in the vehicle based on functionalities respective to each sensor. The data processing system can utilize sensor data indicating characteristics of the vehicle and surface data of the road to generate a road profile. The data processing system can match the generated road profile with a historical road profile to improve the localization of the vehicle.

Thus, by matching the currently generated road profile to the historical road profile, systems, methods, and apparatus of this technical solution can localize vehicles and reduce latency in updating vehicle location, improve localization accuracy, and reduce computational power and resource consumption. Accordingly, by utilizing road profile information to localize the vehicle, the system can provide a more precise location of the vehicle without relying on external signals to compute the current location of the vehicle, for example. Additionally, by localizing the vehicle using road profile information, a controller of the vehicle can control one or more components (e.g., suspension system, steering system, and braking system) of the vehicle based on the current location or predicted next location of the vehicle.

Figure 1:
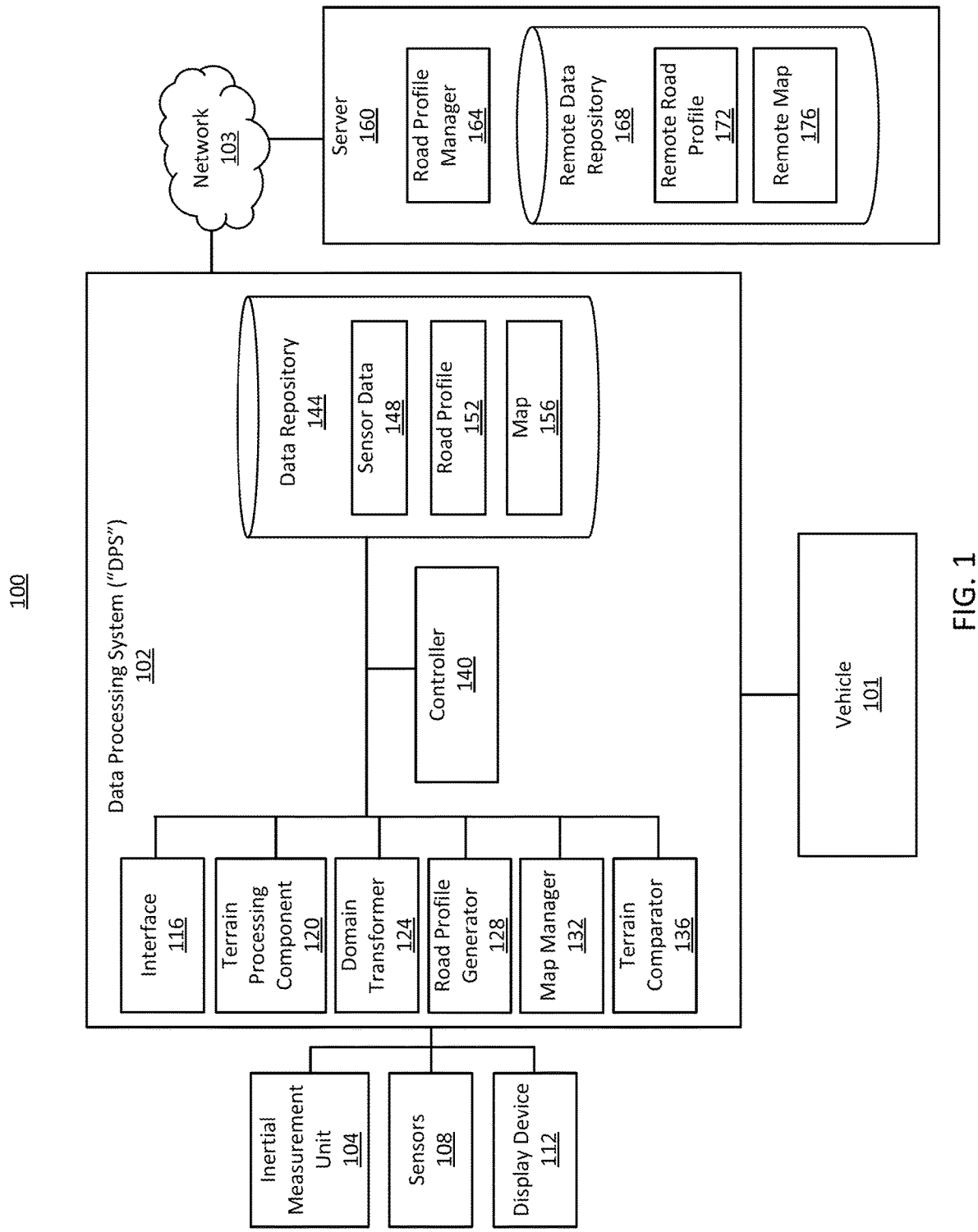
FIG. 1 is a block diagram of an example system to localize a vehicle, in accordance with an implementation.

Referring now to FIG. 1, a block diagram of an example system to localize a vehicle, in accordance with an implementation, is shown. The system 100 can include a vehicle 101, a data processing system ("DPS") 102 electrically connected to the vehicle, a network 103, and a server 160. The system 100 can include inertial measurement unit ("IMU") 104, multiple sensors 108, and at least one display device 112 electrically connected to the vehicle 101 and the DPS 102. The system 100 can include multiple vehicle systems electrically connected to the vehicle 101 and the DPS 102. The DPS 102 can control one or more components of the vehicle 101, such as suspension systems, braking systems, steering systems, or other advanced driver assistance systems ("ADAS") to assist drivers on the road. The sensors can include at least one accelerometer, at least one gyroscope, at least one range sensor, at least one positioning sensor, and at least one imaging sensor. The DPS 102 can connect to the server 160 via the network 103. Connection to the server enables the DPS 102 to upload data (e.g., data packets, information, and files) to and download data from the server. In some implementations or situations, the DPS 102 may not be connected to the server 160, for example, for vehicle localization based on road profile information.

The DPS 102 can include an interface 116, a terrain processing component 120, a domain transformer 124, a road profile generator 128, a map manager 132, a terrain comparator 136, a controller 140, and a data repository 144. The data repository 144 can store vehicle configuration information, such as brand, model, suspension data, steering data, or other configuration data related to the vehicle 101. The data repository 144 can include sensor data 148, road profile storage 152, and map 156 of the road. Each of the components of the DPS 102 can be electrically connected to other components within or external to the DPS 102. The DPS 102 may include one or more additional components to perform, execute, or operate the features of the system 100 described hereinafter.

Each component of the system 100, such as the DPS 102, the IMU 104, the sensors 108, and the vehicle systems, can be implemented using hardware or a combination of software and hardware. The IMU 104 may be a part of the sensors 108. In some cases, the IMU 104 can be replaced with multiple sensors to perform similar features and functionalities, such as at least one accelerometer, at least one gyroscope, and at least one magnetometer. The sensors 108 of the system 100 can also include built-in sensors of the vehicle 101. The display device 112, the brake system, the suspension system, and the steering system may be referred to generally as vehicle systems. The vehicle systems may be a part of the ADAS. Each component of the system 100 can include logical circuitry (e.g., a central processing unit or CPU) that responds to and processes one or more instructions fetched from a memory unit (e.g., memory, storage device, or data repository 144). Each component of the system 100 can include or use a microprocessor or a multi-core processor. A multi-core processor can include two or more processing units on a single computing component. Each component of the system 100 can be based on any of these processors, or any other processor capable of operating as described herein. Each processor can utilize instruction-level parallelism, thread-level parallelism, different levels of cache, etc. For example, the system 100 can include at least one logic device such as a computing device or server having at least one processor.

The components or elements of the system 100 can be one or more separate components, a single component, or a part of the DPS 102. In one example, the IMU 104 (or the other components of the system 100) can include one or more combinations of hardware and software, such as one or more processors configured to receive sensor data to be processed by the DPS 102. In another example, the controller 140 (or the other components of the DPS 102) can include one or more combinations of hardware and software, such as one or more processors configured to control at least one component or system of the vehicle 101, such as the brake system, suspension system, or the steering system. The one or more components can work individually external to the DPS 102. The one or more components can work cooperatively with other components within the system 100.

The components of the system 100 in connection with the vehicle 101 can be implemented in or connected to one or more vehicles different from the vehicle 101. In other words, one or more vehicles can include components similar to components of the system 100 connected to the vehicle 101. The one or more vehicles can operate similar to the vehicle 101. The operation includes data collection, processing, transmission, reception, etc. The one or more vehicles may include different configurations from the vehicle 101, such as make, model, track width, or type of vehicle 101. Data from the vehicle 101 can be processed by the DPS 102 or the server 160 for controlling the one or more vehicles. For example, the vehicle 101 can collect and process sensor data 148. The DPS 102 of the vehicle 101 can process the sensor data received from the sensors 108 to generate a current road profile. The DPS 102 can store the current road profile in the road profile storage 152.

In some implementations, the DPS 102 can transmit the sensor data to the server 160 for processing. The server 160 can include one or more processors and at least one memory to process the sensor data to generate a road profile from the vehicle 101. In some implementations, the server 160 can perform the features and functionalities of the DPS 102, such as data processing, road profile generation, data conversion, and road profile comparison.

The DPS 102 can generate a road profile using road heights determined from the sensor data 148. These road heights can be normalized based on individual vehicle configuration information. For example, the DPS 102 can remove vehicle configuration factors from the road heights to generate a road profile. Thus, the road profile generated via sensor data from the vehicle 101 can be compared to other road profiles generated from one or more additional vehicles. The DPS 102 can generate a road profile using factors, features, and characteristics of the road, such as the road height, road grade, and road friction information. The DPS 102 can include, for example, environmental temperature, geographical data, weather conditions, and other factors that may affect the road into consideration for generating the road profile.

In the case that the DPS 102 generated the road profile, the DPS 102 can transmit the road profile to the server 160 via a network 103. The road profile can be associated with a location of the vehicle 101 (e.g., the location where the vehicle 101 obtain the sensor). The road profile information can be transmitted, from the server 160, via a network 103, to one or more vehicles different from the vehicle 101. In some cases, the server 160 can generate a road profile based on sensor data from the vehicle 101. The server 160 can transmit the generated road profile to the vehicle 101 for processing in real-time.

The DPS 102 can use a current road profile generated by the vehicle 101 to compare with at least one historical road profile stored by the server 160. In some implementations, the DPS 102 can retrieve the historical road profile from the server 160 before traveling on the road. The historical road profile can be associated with a route of the vehicle 101. Based on the comparison between the current road profile and the historical road profile, the DPS 102 can determine a current location of the vehicle 101 by itself, e.g., without relying on satellite signals. Accordingly, vehicle localization can be performed via road profiles comparison.

In some implementations, the DPS 102 can instruct the controller 140 to control at least one vehicle system based on the road profile. For example, the DPS 102 can determine that the vehicle 101 is approaching a road profile indicating an obstruction. Subsequently, the DPS 102 can adjust at least one suspension system of the vehicle 101 at a location corresponding to the approaching road profile to assist drivers on the road and enhance the safety of occupants.

The one or more components of the system 100 can be hosted on or within a vehicle 101. The components of the system 100 can be connected or communicatively coupled to one another. The connection between the various components of the system 100 can be wired or wireless, or any combination thereof.

The vehicle 101 can include an IMU 104. The IMU 104 can be located or mounted on the center of a lateral axis of the vehicle 101. The IMU 104 can be mounted under the vehicle 101, embedded in a part of the vehicle 101, or attached to a side of the vehicle 101 at the center of the lateral axis. The IMU 104 can be located at a distal end of a longitudinal axis, a proximal end of the longitudinal axis, or in between the distal end and the proximal end of the vehicle 101. The distal end and the proximal end can be referred to in at least FIG. 2A. The lateral axis of the vehicle 101 can refer to an axis of the vehicle 101 perpendicular to a direction of the vehicle 101 when moving forward or backward. The longitudinal axis can refer to an axis perpendicular to the lateral axis or parallel to the direction of the vehicle 101 when moving forward. The mounting location of the IMU 104 can be illustrated at least at FIGS. 2A-F. The IMU 104 can operate at a frequency of at least 100 Hertz ("Hz"), such as 120 Hz, 140 Hz, or 160 Hz. In some cases, the IMU 104 can operate at a frequency of less than 100 Hz, such as 90 Hz, 80 Hz, 70 Hz, or some other frequency. The IMU 104 can measure, detect, or otherwise sense vertical acceleration, angular velocity, and lateral acceleration of the vehicle 101 (e.g., vertical acceleration data, angular velocity data, and lateral acceleration data, respectively). The vertical acceleration data, the angular velocity data, and the lateral acceleration data can be referred to generally as acceleration data collected by the IMU 104.

The vertical acceleration data can indicate a changing rate of the vertical velocity of the body of the vehicle 101 at the location of the IMU 104. The vertical acceleration data can be positive as velocity increases in an upward direction and negative as velocity increases in a downward direction, or vice versa. The angular velocity data can indicate a changing rate of a roll angle of the vehicle (e.g., the rotational motion of the body of the vehicle 101). The angular velocity data can be positive as the vehicle 101 rotates clockwise and negative as the vehicle 101 rotates counterclockwise or anticlockwise direction. The indication of the positive velocity and the negative velocity can be interchangeable, based on the orientation of the IMU 104 mounted on the vehicle 101. The lateral acceleration data can indicate the changing rate of a side-to-side velocity of the body of the vehicle 101. The lateral acceleration data can be positive as lateral velocity increase towards the right side and negative as lateral velocity increase towards the left side, or vice versa. The IMU 104 can transmit the acceleration data to the DPS 102. The DPS 102 can receive the acceleration data, and store the acceleration data in a data repository 144. For example, the IMU 104 can detect close to zero vertical acceleration, angular velocity, and lateral acceleration during a trip with constant velocity on a smooth road surface without turning the vehicle 101.

In some implementations, the IMU 104 can be substituted with at least an accelerometer, a gyroscope, and a magnetometer. The accelerometer, the gyroscope, and the magnetometer can be in electrical communication. These sensors can be located in contact with each other to replicate a single sensor (e.g., the IMU 104). The accelerometer, the gyroscope, and the magnetometer can perform features and functionalities similar or equivalent to the IMU 104. In some cases, each of the aforementioned sensors may be separate components, operating independently and located distant from the others.

In some implementations, the IMU 104 can measure vertical velocity data, angular velocity data, and lateral velocity data of the body of the vehicle 101. The vertical velocity data, angular velocity data, and lateral velocity data may be referred to as velocity data measured by the IMU 104. The IMU 104 can measure the velocity data in addition to the acceleration data. The velocity data can indicate the speed of the vertical, angular, and lateral motion of the vehicle 101. In some cases, the acceleration data can be converted to velocity data using a data conversion technique or equation. In some implementations, the IMU 104 can measure vertical acceleration data, angular acceleration data, and lateral acceleration data of the body of the vehicle 101. The vertical acceleration data, angular acceleration data, and lateral acceleration data may be referred to as acceleration data measured by the IMU 104. In some cases, the vertical data can be converted to acceleration data using a data conversion technique.

The vehicle 101 can include at least one range sensor, such as an ultrasonic sensor, a laser sensor, a light detection and ranging ("LiDAR") sensor, or an infrared sensor. The range sensor can be mounted or located on a lateral axis of the vehicle 101 with the IMU 104. The range sensor can be mounted on the vehicle 101 to be directed or pointed towards a center tread width of the wheel in contact with the ground. The vehicle 101 can include a range sensor corresponding to each wheel of the vehicle 101, such as a first range sensor for the left wheel and a second range sensor for the right wheel. The range sensor can measure a distance between the range sensor and a portion of the ground that contacts a wheel of the vehicle 101. The range sensor can be mounted lower than the IMU 104. Examples of the mounting positions of the range sensor can be illustrated at least at FIGS. 2A-F.

The range sensor can measure a vertical displacement of a wheel. The range sensor can operate at a frequency similar to the operation frequency of the IMU 104 (e.g., 100 Hz, 120 Hz, or 140 Hz). The range sensor can measure the vertical displacement data at a resolution of fewer than 5 millimeters. The vertical displacement can correspond to a distance between the range sensor and a portion of the ground that contacts the wheel of the vehicle 101. The range sensor can be located adjacent to the center tread width of the wheel, such as to measure a travel path of the wheel. The vertical displacement between the range sensor and the ground can be similar to or indicate a vertical displacement between a side of the vehicle 101 and the ground. The range sensor can transmit the vertical displacement data to the DPS 102. The system 100 can include multiple sensors 108 with similar functionalities for placement at different portions of the vehicle 101 or for averaging the sensor data.

The vehicle 101 can include a positioning sensor to determine an approximate location of the vehicle and an altitude of the vehicle 101. The positioning sensor can be mounted on, embedded in, or attached to the vehicle 101. The positioning sensor can include a differential global positioning system ("GPS"), a real-time kinematic ("RTK") GPS, or other sensors to locate the vehicle 101. The positioning sensor can detect the location of the vehicle 101. Subsequently, the positioning sensor can transmit the location data to the DPS 102. The altitude data of the vehicle 101 can be derived from the location data transmitted by a satellite.

The positioning sensor can be connected to or in communication with a base station. The positioning sensor may be used to determine the location prior to generating a road profile. The positioning sensor can receive location data from the satellite and intercommunication with a base station. The positioning sensor can be used in parallel with road profile matching to determine the location of the vehicle 101. In some implementations, the DPS 102 may disable the positioning sensor subsequent to receiving an initial location of the vehicle 101. The DPS 102 can utilize the initial location to retrieve a historical road profile associated with the initial location. Accordingly, the DPS 102 can compare live data (e.g., current road profile or live reconstructed fingerprint) to the historical road profile along the route to determine a current location of the vehicle 101. In some implementations, the vehicle 101 can include multiple positioning sensors, such as a combination of a differential GPS and an RTK GPS. The differential GPS and the RTK GPS can operate independently as separate systems or synchronously detect the location of the vehicle 101.

The DPS 102 can identify a first location of the vehicle 101 using the positioning sensor. The first location can refer to a starting location of the vehicle 101, such as when the operator initiates one or more engines of the vehicle 101. The DPS 102 can identify, for the first location of the vehicle 101, a historical road profile of the ground indicative of vertical displacements between the body of the vehicle and the ground at multiple locations including the first location. The road profiles, including a current road profile and a historical road profile, can include vertical displacement data of one or more vehicles. The vertical displacement data can refer to vehicle body height with respect to the ground. In some cases, the road profiles may include road height data instead of the vertical displacement data.

The vehicle 101 can include at least one imaging sensor, such as an infrared camera or other digital cameras. The imaging sensor can be mounted on the vehicle 101 (e.g., roof, adjacent to the windshield, front plate, or at the headlight of the vehicle 101) to record, detect, or sense images of the road. For example, the mounting location of the imaging sensor can be shown at least at FIGS. 2A-B. The imaging sensor can transmit image data including the images of the road to the DPS 102. The image data can be referred to as, or used interchangeably with other descriptive terms, such as visual data, imaging data, or optical signal. The imaging data can be used by the DPS 102 to determine or identify at least the lane on the road the vehicle is currently in and a lateral deviation of the vehicle 101. The lateral deviation can indicate a distance of the vehicle 101 from the center of the lane of the road. In some cases, the lateral deviation can both the lane occupied by the vehicle 101 and the deviation of the vehicle 101 from the center of that lane.

The sensor data received from each of the sensors 108 can include timestamps indicating a receipt time of the measurement for each sensor. The DPS 102 can receive the sensor data in the temporal-domain or time-domain. To compare live data (e.g., current road profile) generated by the vehicle 101 and map data (e.g., historical road profile), the DPS 102 can convert the sensor data 148 from temporal-domain to distance-domain or spatial-domain. In some implementations, the DPS 102 can convert a generated current road profile in the temporal-domain to spatial-domain before comparing with the historical road profile. The timestamp can be applied to any data upon receipt by the DPS 102. The DPS 102 can also receive sensor configuration information, such as model, make, and firmware version. The aforementioned sensors can be included in the sensors 108.

The vehicle 101 can include a display device 112. The display device 112 can be embedded or mounted inside the vehicle 101. The display device can be mounted at the dashboard or other location accessible by the driver of the vehicle 101. A pad or other mounting component can be used to mount the display device 112 in the vehicle 101. The driver or operator can operate and visualize collected sensor data via the display device 112. The display device 112 can be a touchscreen device with interactive elements for drivers to operate. The display device 112 can display at least one notification in response to receiving an alert from the DPS 102. The alert can include updates to a software component of the system 100 or a request to upload collected data stored in the memory of the vehicle 101 to the server 160.

The display device 112 can receive display information for occupants of the vehicle 101, such as a user interface, notifications, a route from an initial location to a destination location, and a current location of the vehicle 101 along the route. The display device 112 can include settings to configure the refresh rate of the display device 112. The refresh rate can determine an update frequency of the display screen. For example, the DPS 102 can receive updated locations of the vehicle 101 every 500 milliseconds ("ms"). In this case, if the refresh rate of the display device 112 is 60 hertz, the display device 112 may skip every other updated location of the vehicle 101, for example. Hence, the display device 112 may not display all updated information associated with the location of the vehicle 101. In some implementations, the display device 112 refresh rate can represent the frequency of comparing a current road profile to a historical road profile. The DPS 102 may compare the current road profile to the historical road profile and send an update to at least one component of the system 100, for example, every 50 ms, 100 ms, 200 ms, etc.

The vehicle 101 can include at least one braking system, at least one suspension system, and at least one steering system electrically or mechanically coupled to other components of the system 100. These systems can be referred to generally as vehicle systems. The vehicle systems can be configured by the DPS 102 (e.g., via a controller 140) based on processing sensor data from multiple sensors of the system 100. The brake system can control a frictional force applied to the tire for deceleration or to decrease the velocity of the vehicle 101. The brake system can increase or decrease the frictional resistance. Increasing the frictional resistance can absorb higher kinetic energy or potential energy from the vehicle 101. Decreasing the frictional resistance can absorb less energy from the vehicle 101. The frictional resistance can be adjusted based on a coefficient of friction. The coefficient of friction can consist of varying ranges, such as 0.3 to 0.5, 0.4 to 0.8, or other ranges based on a type, a model, or a configuration of the vehicle 101. The coefficient of friction can be referred to as, and used interchangeably with other terms, such as brake level or braking coefficient. Increasing the brake level can increase the frictional resistance and decreasing the brake level can decrease the frictional resistance. By adjusting the brake level depending on the road profile, the system 100 can improve fuel consumption and energy consumption of the vehicle 101.

The suspension system of the vehicle 101 can be a semi-active suspension or an active suspension. The suspension system can receive instructions from the DPS 102 to configure a dampening level of the suspension, such as for a semi-active suspension system. Increasing the dampening level of the suspension can increase the dampening force applied in an upward and a downward direction to the suspension. Decreasing the dampening level of the suspension can decrease the dampening force in both directions. The adjustment in the dampening level based on the road profile can assist drivers on the road by increasing traction of the tire to the road surface. The suspension system can receive instructions from the DPS 102 to increase or decrease the height of at least one wheel of the vehicle 101, such as for active suspension system. By increasing and decreasing the height of the wheel, the DPS 102 can improve traction between the wheel and the road surface. For example, in cases where a wheel may dip or ascend from the ground, such as with potholes or bumps, the DPS 102 can command the suspension system to increase or decrease wheel height to increase traction between the wheel and the surface.

The steering system can include a rack and a pinion to assist operators with the steering of the vehicle 101. The DPS 102 can provide instructions to the steering system to control or assist the steering of the vehicle 101. The steering system can assist the steering of the vehicle 101 by providing feedback to the steering wheel based on the orientation an operator turns the steering wheel. For example, if the operator provides a force to rotate the steering wheel in a certain direction, the steering system can provide feedback to assist with turning the steering wheels in accordance with the direction provided by the operator. The DPS 102 can control the feedback force to the steering wheel via the steering system. For example, the DPS 102 can provide more feedback force during a turn, and less feedback force during a straight route. In another example, the DPS 102 can receive an indication of an obstruction generally in front of the vehicle 101. Accordingly, the DPS 102 can increase the feedback force in response to an operator initiating a force on the steering wheel. Thus, by localizing the vehicle using the current road profile, the vehicle systems can assist drivers on the road by increasing traction between the wheels and the road surface, applying feedback to the steering, and increasing fuel efficiency based on the road profile, for example. In some implementations, the DPS 102 can predict, responsive to matching the current road profile and the historical road profile, that the vehicle 101 will encounter an obstacle. Accordingly, the DPS 102 can instruct the vehicle systems to perform at least one function responsively to meditate the effect of the obstruction.

The vehicle 101 can include built-in sensors, such as to measure velocity, yaw rate, individual wheel rotation speed, and other information of the vehicle 101. The built-in sensors can be embedded into the vehicle 101 during the manufacturing process of the vehicle 101. The built-in sensors can be electrically connected to components of the system 100. The built-in sensors can be additional sensors from the IMU 104 and the sensors 108. Data from the built-in sensors can be transmitted to the DPS 102 for controlling at least one of the vehicle systems.

The vehicle 101 can include a DPS 102 electrically connected to other components of the system 100. The DPS 102 can control one or more components of the vehicle 101, such as the vehicle systems. The DPS 102 can include an interface 116, a terrain processing component 120, a domain transformer 124, a road profile generator 128, a map manager 132, a terrain comparator 136, a controller 140, and a data repository 144. The components of the DPS 102 can be a software component or a hardware component. The DPS 102 can receive and process data from the sensors 108 of the vehicle 101. The DPS 102 can display a notification, data, or any information to the user via the display device 112. The DPS 102 can receive command or instructions from an operator of the vehicle 101 via an interaction with the display device 112. The DPS 102 can control components of the system 100 based on processed sensor data and generated road profile. The DPS 102 can retrieve a historical road profile from the server 160. The historical road profile can be stored in the road profile storage 152. The historical road profile can be associated with one or more locations on the map. The DPS 102 can compare the road profile generated by the DPS 102 (e.g., a current road profile) to the historical road profile. Based on the comparison, the DPS 102 can determine a match between the two road profiles. In some cases, the comparison can be between the current road profile and a portion of the historical road profile associated with a location on the map. Subsequently, the DPS 102 can provide an indication of a current location of the vehicle 101 in response to the match.

In some implementations, the DPS 102 may be an intermediary device or component to transfer the collected data from the sensors 108 to a server 160. The server 160 may be referred to as a cloud or a remote data processing system. The DPS 102 can connect to the server 160 via a network 103. For example, the DPS 102 can receive sensor data 148 from the sensors 108 to generate the road profile. The road profile can be generated, for example, based on road heights. The DPS 102 can transmit the sensor data stored in sensor data 148 to the server 160 via the network 103. The server 160 can perform similar features and functionalities as the DPS 102 to generate a current road profile of the vehicle 101.

In some implementations, the server 160 can compare the current road profile with a historical road profile stored in the remote road profile 172. The road profile manager 164 of the server 160 can select the historical road profile for comparison based on an approximate location of the vehicle 101. Therefore, the server 160 can exhibit similar features as the DPS 102 for vehicle localization.

The interface 116 of the DPS 102 can provide an interface between each of the components of the system 100. The transmission and reception of data can be traversed across the components of the system 100 via the interface 116. The interface 116 can include one or more ports for external connection to the DPS 102, such as a serial port, USB port, display port, Ethernet port, or Bluetooth receiver and transmitter. The one or more ports can be used to transfer one or more data to or from the data repository 144, such as vehicle configuration information, sensor data 148, one or more road profiles stored in the road profile storage 152, map 156, and control programs to instruct at least one vehicle system. The interface 116 can connect the DPS 102 to the network 103 for connection to the server 160.

The DPS 102 can receive, via one or more sensors 108 on the vehicle 101, sensor data 148 including vertical displacement signals indicating vertical displacement between a body of the vehicle 101 and a ground on which the vehicle traverses. The ground may be referred to as a road surface the vehicle 101 is positioned on. The DPS 102 can receive lateral displacement data from the one or more sensors 108. The DPS 102 can transmit the sensor data 148 to the terrain processing component 120 to determine, based on the lateral displacement data, a lateral deviation of the vehicle. The lateral deviation can refer to the lane the vehicle 101 is positioned at. The lateral deviation can refer to a distance the vehicle 101 deviates from the center fo the lane.

The terrain processing component 120 of the DPS 102 can determine one or more features of the vehicle 101 to compute a road profile, such as a height of the vehicle 101 with respect to the ground. The terrain processing component 120 can determine one or more features of the road, such as road grade, road height, road angle, and road slope, to generate the road profile. The terrain processing component 120 can utilize the sensor data 148 received from the sensors 108 to determine the features of the vehicle 101 and the road. The road may be referred to as the ground, granite, or surface that the vehicle 101 resides on. The terrain processing component 120 can determine the features of the vehicle 101 and the road by incorporating the vehicle configuration data and other bias data with respect to the vehicle 101 for normalization. Accordingly, the terrain processing component 120 can determine 1) the features of the road without the vehicle 101 bias; and 2) the features of the vehicle 101, for example, having a centralized suspension level, braking coefficient, velocity, and factors that could affect the height of the vehicle 101.

The terrain processing component 120 can generate a model (e.g., state-space model or other probabilistic graphical models) based on the collected data to determine the height of the vehicle 101. The terrain processing component 120 can transmit data to the domain transformer 124 for conversion from temporal-domain to spatial-domain. In some implementations, the terrain processing component 120 can incorporate the features of the domain transformer 124. For example, the terrain processing component 120 can transmit data in spatial-domain directly to the road profile generator 128. Accordingly, the road profile generator 128 can generate a road profile in the spatial-domain to localize the vehicle 101. The terrain processing component 120 can apply at least one filtering technique to the generated model the bias or noise of the data (e.g., stochastic noise). The terrain processing component 120 can determine the vehicle height based on actual vertical vehicle body height data, actual vertical vehicle body velocity data, sensor bias data, vertical velocity data based on the sensor data 148, random noise data, and altitude data based on the location sensor. Utilizing the aforementioned variables, the terrain processing component 120 can generate a model which may include noise and other variation in the data. To remove the noise, the terrain processing component 120 can apply a filtering technique to the model or insert the model into a filter (e.g., Kalman filter).

The terrain processing component 120 can include various other components to determine the road height and vehicle height. For example, the terrain processing component 120 can include a roll angle processing component to determine an actual roll angle of the vehicle 101 by performing data fusion on the sensor data 148. The actual roll angle may refer to the roll angle experience by the vehicle 101, instead of the roll angle sensed by the sensors 108. The roll angle processing component can determine the actual roll angle of the vehicle 101 by utilizing the initial roll angle calculated using sensor data 148. The roll angle processing component can filter acceleration force exerted at the y-axis and the z-axis of the vehicle 101 at a cutoff frequency of 0.5 Hz. The roll angle processing component can integrate an angular acceleration of the vehicle 101, which can be derived from an angular velocity of the vehicle 101. The integration of the angular velocity of the vehicle 101 may introduce a drift. The introduced drive can be attenuated or removed by performing data fusion with the first roll angle. A model (e.g., the state-space model) can be generated based on the aforementioned data to determine the actual roll angle. The model generated to determine the vehicle height may be referred to as a first model or a first state-space model. The model generated to determine the actual roll angle of the vehicle 101 may be referred to as a second model or a second state-space model. A filter (e.g., Kalman filter) can be applied to the model to an estimated and actual roll angle.

The terrain processing component 120 can include a surface detection component. For instance, the surface detection component can determine a road height based on the sensor data 148, the height of the vehicle 101 from the ground, and the roll angle of the vehicle 101 determined from the roll angle processing component. The road height may be referred to as an elevated surface from the ground. The road height can include inclination or slope, which can be referred to as road grade. To determine the road height, the surface detection component can utilize a vehicle track width data (e.g., retrieve from vehicle configuration information stored in the data repository 144), vehicle roll angle as determined above, vertical displacement data at the location of the IMU 104, range sensor measurement data associated with a left wheel and a right wheel of the vehicle 101, and a left side road height and a right side road height. The left side road height and the right side road height can be associated with the center tread width of the vehicle wheels.

The surface detection component can determine the road height based on the first height at the first side of the road and the second height on the second side of the road. To determine the first height and the second height of the road, the surface detection component can arithmetic on the sensor data 148, data determined by the roll angle processing component, Kalman filter, and at least one data fusion technique, for example. The data fusion technique can refer to a technique to combine or process data from multiple sensors with an application of a filter to remove noise, bias, or other drift in the sensor data. The DPS 102 can utilize the road height to generate a current road profile of the vehicle 101. The surface detection component can include collected vehicle information, such as controller area network ("CAN") data of the vehicle to calculate vehicle speed, individual wheel spins, yaw rate, etc., to determine the road curvature, surface friction, and low-frequency road grade of the road.

The terrain processing component 120 can include lane detection features. The terrain processing component 120 can receive image data from at least one imaging sensor of the sensors 108 to process via a deep learning engine, a machine learning engine, or other neural network systems. The engine or system may be referred to as technique or feature. By processing the image data via at least one machine learning engine, the terrain processing component 120 can identify the lane used by the vehicle 101 in a multi-lane road. Furthermore, the lane detection feature of the terrain processing component 120 can identify a lateral deviation of the vehicle 101 from the center of the lane. The lateral deviation can refer to a distance from the center of a lane on the road. The lateral deviation can refer to both the lane occupied by the vehicle 101 and the distance of the vehicle 101 from the center of the lane.

In some implementations, the terrain processing component 120 can identify obstructions on the road via the machine learning engine. The obstructions can include at least a bump, pothole, curb, crack, or other objects on the road. The information determined by the terrain processing component 120 may be used by the road profile generator 128 to generate a road profile including all the information of the road.

The following models and equations can be used by the terrain processing component 120 to determine the road height:

$$\frac{d}{dt}\begin{bmatrix}z\\v\\b\end{bmatrix} = \begin{bmatrix}0 & 1 & 0\\0 & 0 & -1\\0 & 0 & 0\end{bmatrix}\begin{bmatrix}z\\v\\b\end{bmatrix} + \begin{bmatrix}0\\1\\0\end{bmatrix}a_m + \begin{bmatrix}0\\0\\n_b\end{bmatrix}$$

$$h = \begin{bmatrix}1 & 0 & 0\end{bmatrix}\begin{bmatrix}z\\v\\b\end{bmatrix} + n_h$$

$$\theta_{acc} = -\tan(\ddot{y}_m/\ddot{z}_m)$$

$$\frac{d}{dt}\begin{bmatrix}\theta\\b_\theta\end{bmatrix} = \begin{bmatrix}0 & -1\\0 & 0\end{bmatrix}\begin{bmatrix}\theta\\b_\theta\end{bmatrix} + \begin{bmatrix}1\\0\end{bmatrix}\omega_m + \begin{bmatrix}0\\n_b\end{bmatrix}$$

$$\theta_{acc} = \begin{bmatrix}1 & 0\end{bmatrix}\begin{bmatrix}\theta\\b\end{bmatrix} + n_\theta$$

$$R_L = z - \frac{L}{2}\sin(\theta) - D_L\cos(\theta)$$

$$R_R = z + \frac{L}{2}\sin(\theta) - D_R\cos(\theta)$$

$$R_L = z - \frac{L}{2}\theta - D_L$$

$$R_R = z + \frac{L}{2}\theta - D_R$$

The variables in the models and equations above can include:
- z: Actual vertical vehicle body height of the vehicle 101 at the IMU 104;
- v: Actual vertical vehicle body velocity based on the vehicle configuration data;
- b: Sensor bias (e.g., from gravity, temperature, etc.);
- $a_m$: Vertical velocity data of the vehicle 101 measured by at least one sensor containing the sensor bias b. The vertical velocity data can be derived from vertical acceleration data measured by the IMU 104;
- $n_b$: Random noise used to model the changing rate of b. The changing rate can refer to the variation rate of the sensor bias due to factors such as gravity;
- $n_h$: Random noise used to model a measurement noise on an altitude data collected from the positioning sensor;
- h: Altitude data collected from the positioning sensor;
- $\ddot{y}_m$: Lowpass filtered acceleration measurements along the y-axis of the vehicle 101;
- $\ddot{z}_m$: Lowpass filtered acceleration measurements along the z-axis of the vehicle 101;
- $\theta_{acc}$: Roll angle determined based on the lateral acceleration data and the vertical acceleration data;
- $\theta$: Actual roll angle of the vehicle 101;
- $b_\theta$: bias of gyroscope of the IMU 104. The bias can vary incrementally based on factors, such as time, noise, and operation condition (e.g., climate, location, or altitude);
- $\omega_m$: Angular velocity measurement from the IMU 104;
- $n_\theta$: Random noise to model $\theta - \theta_{acc}$;
- L: A vehicle track width;
- $D_L$: Left range sensor measurement;
- $D_R$: Right range sensor measurement;
- $R_L$: Left side road height; and
- $R_R$: Right side road height.

The domain transformer 124 of the DPS 102 can convert data from temporal-domain to spatial-domain. The data can be from the IMU 104, the sensors 108, or the terrain processing component 120. The domain transformer 124 may be referred to as a live buffer. For example, the signal constructed via the terrain processing component 120 or receive via the IMU 104 and the sensors 108 can be in the temporal-domain. To compare the similarity between the live data (e.g., current road profile generated by the DPS 102) and map data (e.g., historical road profile retrieve from the server 160 or stored in the road profile storage 152), the domain transformer 124 can the data from a temporal domain into a spatial domain. By this conversion, the variations in velocity of the vehicle 101 and one or more vehicles associated with the historical road profile can be eliminated. In some implementations, the conversion between the temporal-domain and spatial-domain can be a part of normalizing the data to generate the road profile.

The domain transformer 124 can utilize an instantaneous timestamp, vehicle longitudinal speed, and the sensor data 148 used to generate a road profile to output a data array in spatial-domain. In particular, the domain transformer 124 can use vertical displacement signals of the current road profile, one or more timestamps corresponding to the vertical displacement signals, and longitudinal velocity data of the vehicle 101 received via the one or more sensors 108. In some implementations, the DPS 102 can generate the road profile prior to conversion to the spatial-domain. For example, the domain transformer 124 can utilize the instantaneous timestamp, the vehicle velocity, and the road profile (e.g., fingerprint) with N-dimensional. The domain transformer 124 can output an array of fingerprints in distance. The array can include a size N-by-L, where N can be the same dimension as the input, and L can be the number of distance points. The distance points can be predetermined or set by an operator of the vehicle 101. In some cases, the backend process, such as the number of distance points to aggregate for comparison between different road profiles, can be predetermined at the vehicle 101 manufacturer. In some cases, the distance points can be dynamically configured based on the distance points from the historical road profile. For example, to reconstruct the last 60 meters of fingerprints in 2-dimension ("2D"), the domain transformer 124 can sample the longitudinal distance at every 20 centimeters. The output of the live buffer can include a size of 2-by-300. For further example, the depiction of the conversion of the road profile from temporal-domain to spatial-domain can be seen in FIG. 4.

The road profile generator 128 of the DPS 102 can generate a road profile (e.g., a current road profile) of the road or ground including a vertical model of the road. The road profile generator 128 can generate the road profile based on the sensor data 148 including at least vertical displacement signals. The road profile generator 128 may be referred to as a fingerprint generator to generate a fingerprint of the road. The vertical displacement signals may be referred to as vehicle height signals. The road profile generator 128 can generate consistent signals that only depend on the road. Generating the road profile may be referred to as mapping the road based on collected or determined information on the road. The road profile can be represented as a 2D model or a 3D model of the road. The road profile can be a 2D vertical model, corresponding to a visual representation of an operator observing the road from the vehicle 101. In some cases, the road profile can be a 2D map of an area. The 2D map may be color-coded or otherwise labeled based on the collected information on the road. The road profile may indicate a road grade based on data from the terrain processing component 120 indicating a slope or an incline to of the road. The DPS 102 can store the generated road profile in the road profile storage 152.

The road profile generator 128 can generate a road profile using information determined by the terrain processing component 120, such as the vertical displacement data, the longitudinal velocity data, the vertical velocity data, and the angular velocity data. In some cases, the road profile generator 128 can generate the road profile using roll angular velocity data and pitch angular velocity data. For example, the road profile generator 128 can include road surface friction data in the road profile. The road profile generator 128 can include a low-frequency road grade (e.g., road noise) of the road. The road noise can refer to sounds detected on the road. Higher low-frequency noise can indicate higher traffic on the road. The input signals for generating a road profile can include vehicle longitudinal velocity, location data, data from the IMU 104 mounted on the vehicle 101, and displacement data between the vehicle body and the ground determined from one or more range sensors. The input signals can include other sensor data 148, such as vertical acceleration data indicating the characteristics of the suspension of the vehicle 101, and other sensor data 148 stored in the data repository 144. The characteristic of the suspension can be used to remove vertical acceleration data bias between different vehicles.

The road profile generator 128 can generate a road profile with an indication of a road height at the location of the vehicle 101. The road height can be interchangeable with the vehicle vertical displacement signals for generating the road profile. The DPS 102 can utilize the road profile to generate or update the map 156. For example, the map 156 can include images of the road in 2D. With the road profile, the DPS 102 can update the road to 3D images. The map 156 can include marking and labels at multiple locations indicating one or more road profiles associated with each location. In some implementations, the DPS 102 can determine that a first road profile generated by the road profile generator 128 corresponds to a second road profile stored in the road profile storage 152. The correspondence between the first road profile and the second road profile can refer to a record at the same location on the map 156. In this scenario, the DPS 102 can update the second road profile already stored in the road profile storage 152 by averaging between the two road profiles. In the alternative, the DPS 102 may determine to remove the first road profile, for example, based on the first road profile being less accurate than the second road profile, the difference in data is greater than a threshold (e.g., 10%, 15%, or 20% differences). In another scenario, the DPS 102 may replace the second road profile stored in the road profile storage 152 with the first road profile. The DPS 102 can determine to replace the second road profile, for example, base on the process to remove the first road profile, but instead removing the second road profile.

The DPS 102 can normalize vertical velocity data and angular velocity data associated with longitudinal velocity data of the vehicle 101 to a predetermined velocity. The velocity data received from the sensors 108. For example, if the vehicle 101 travels at a high longitudinal velocity, the vehicle 101 can experience an increase in the vertical velocity and the angular velocity instead of at low longitudinal velocity. The increase in the vertical velocity and the angular velocity can be proportional or in relation to the longitudinal velocity. Therefore, the DPS 102 can normalize the velocity data at a predetermined longitudinal velocity. Accordingly, the road profile generator 128 can generate the current road profile of the ground based on the sensor data 148 including the longitudinal velocity data, the vertical velocity data normalized to the predetermined velocity, the angular velocity data normalized to the predetermined velocity, and the vertical displacement signals The road profile can be combined with a map 156 from a map provider or the server 160. The map can be embedded or updated with the road profile. In some implementations, the map 156 can be stored on the server 160 in remote map 176. The DPS 102 can transmit data, such as the road profile generated by the road profile generator 128 to update the remote map 176. The remote map 176 can be centralized for access to multiple vehicles. In some implementations, in response to updating the map 156, the DPS 102 can upload the map 156 to the server 160 to update the remote map 176. The server 160 can determine whether to store the map 156 in the remote map 176, remove the map 156 (e.g., not to store the map 156), or replace the remote map 176 with the map 156. The server 160 can determine to store, replace, or remove a portion of the map 156, such as the portion with the generated road profile.

The road profile generator 128 can generate a road profile with an indication of a lane the vehicle 101 is traveling on. The road profile generator 128 can include an indication of a lateral deviation of the vehicle 101 from the center of the lane. The road profile can include one or more obstructions on the road. The lane and the one or more obstructions can be detected by the terrain processing component 120 including lane detection features.

The road profile generator 128 can generate a normalized road profile for usage by one or more vehicles with different configurations. For example, the sensors 108 can include one or more acceleration sensors located at the top and the bottom of each suspension of the vehicle 101. The terrain processing component 120 can determine, via the acceleration sensors, suspension dynamic data of the vehicle 101. The road profile generator 128 can normalize the vertical displacement signals of the current road profile based on the suspension dynamic data of the vehicle 101. The DPS 102 can send the normalized current road profile to the terrain comparator 136. The terrain comparator 136 can compare the historical vertical displacements of the historical road profile with the normalized vertical displacement signals of the current road profile at the second location that aligns with the lateral deviation. The historical road profile can be generated from one or more vehicles with different suspension configurations.

The DPS 102 can be configured to map the road and conduct localization for a single vehicle 101. The single vehicle 101 can refer to vehicles with a similar or identical platform (e.g., same make and model). In another case, conducting localization for the single vehicle 101 can refer to using a historical road profile generated by the vehicle 101 comparing with the current road profile also generated by the vehicle 101. In this case, the road profile generator 128 can utilize data from the IMU 104 mounted inside the vehicle body and the sensors 108 to generate the road profile. Using the sensors 108 including the IMU 104, the DPS 102 can generate the following signals:
1) vertical velocity (m/s)—normalized to a certain speed;
2) vertical displacement (m);
3) pitch angular velocity (rad/s)—normalized to a certain speed;
4) pitch angle (rad);
5) roll angular velocity (rad/s)—normalized to a certain speed; and
6) roll angle (rad).

The vertical velocity listed above may be dependent on the longitudinal speed of the vehicle. Therefore, the road profile generator 128 may normalize the signals to a predetermined speed or velocity, such as say 15 m/s or 25 m/s. In situations where some signals may not be directly measured, the DPS 102 can reconstruct the signals by utilizing one or more estimators or filters, such as Kalman filters. The signals used by the road profile generator 128 may be converted from temporal-domain to spatial-domain prior to generating a road profile of the vehicle 101 to remove one or more effects of vehicle velocity variations.

Different vehicles can utilize the historical road profile for comparison. For example, a first vehicle can collect a first drive session data to generate map data comprising the historical road profile, and a second vehicle, different from the first vehicle, can utilize the map data for localization. To utilize map data from a different vehicle, the DPS 102 can remove the effect of the suspension prior to generating the road profile, e.g., removing suspension dynamics. Due to the suspension spring rates and suspension damping ratio, the vehicle body motion can be different between two vehicles even on the same road. Therefore, at least one range sensor can be utilized, as discussed above, in combination with an IMU 104 in the vehicle body to estimate the vertical road profile (e.g., road heights). By constructing the road profiles with the road heights, the road profile generator 128 can generate a road profile independent of the vehicle suspension dynamics, which can be consistent across different vehicle platforms.

The map manager 132 of the DPS 102 can identify, for a first location of the vehicle 101, a historical road profile of the ground indicative of vertical displacements between the body of the vehicle 101 and the ground at multiple locations including the first location. The first location of the vehicle 101 can refer to a location an operator ignites one or more engines of the vehicle 101. The DPS 102 can utilize a location sensor to determine the first location. Once a first location of the vehicle is determined, the map manager 132 can load or retrieve map data from the map 156 in the data repository 144. The map data can include a collection of landmarks with their associated location on the road. Each landmark can be associated with snippets of fingerprints or a historical road profile. In some implementations, each landmark can be associated with a portion of the historical road profile, where the historical road profile includes vertical displacement data or road height data for a route having the landmarks. An example illustration of a route including one or more landmarks can be seen in FIG. 5.

The map manager 132 can transmit one or more landmarks to the terrain comparator 136 based on the first location of the vehicle. By transmitting the one or more landmarks, the DPS 102 can compare a current road profile generated via the road profile generator 128 (e.g., on-board the vehicle 101) to a historical road profile associated with at least one of the one or more landmarks. The map manager 132 may retrieve the map data any time prior to comparing the current road profile and the historical road profile.

In some implementations, the DPS 102 can determine a trajectory of the vehicle based on location data of the vehicle received from the one or more sensors 108, such as the position sensor. The map manager can determine, based on the first location (e.g., the initial location) of the vehicle 101 and the trajectory of the vehicle 101, the vehicle approaches multiple landmarks. Each landmark corresponding to a location on the map 156. The map manager 132 can retrieve the historical road profile of the ground including the landmarks. The historical road profile and the landmarks can be generated by one or more vehicles using sensor data 148 corresponding to the one or more vehicles. For example, the map manager 132 can determine to retrieve landmark data responsive to determining the route of the vehicle 101. Subsequent to determining the route, the map manager 132 can retrieve one or more landmarks along the route. Each of the landmark corresponding to a location on the map 156, such that when the terrain comparator 136 compares the current road profile to the historical road profile, the DPS 102 can provide a current location of the vehicle 101 associated with at least one landmark on the map 156.

In some implementations, the map manager 132 can load the map data stored in the remote road profile 172 on the server 160 via the network 103. The map data loaded from the server 160 can be stored or updated in the map 156. In some implementations, the map manager 132 can determine that the map 156 is updated or has the latest version. Thus, the map manager 132 may not retrieve the map data from the server 160. In some implementations, the process of retrieving map data from the remote road profile 172 stored on the server 160 is for updating the map 156 in the data repository 144. The map 156 may be updated manually or automatically based on a cycle. For example, an operator or a manufacturer of the vehicle 101 can preset the cycle to one week. Accordingly, the map manager 132 can retrieve map data from the server 160 once every week to update the map 156.

An example process to generate a map data for same-vehicle-platform and with passive suspension, given an unmapped road and a vehicle 101 to map the road, can include:
1) Traversing the vehicle 101 on the road. The vehicle 101 can be equipped with a location sensor, an IMU 104, a range sensor, an imaging sensor, and a DPS 102. The DPS 102 can receive at least vertical displacement data and roll angle data of the vehicle 101. The DPS 102 can normalize these data to a predetermined longitudinal speed.

2) Convert fingerprints generated using the sensor data 148 having time-series data into spatial-domain as a few arrays.
3) Evenly sample the fingerprints, cropping the fingerprints to create a set of landmarks. Each point of the landmarks can be associated with a GPS or a Global Navigation Satellite System ("GNSS") coordinate including latitude and longitude, a relative index on the road stretch (e.g., route), and an index of the lane. The index of the lane can indicate which lane in a multi-lane road the road profile corresponds to.

Subsequent to the above process, the DPS 102 can generate an initial map 156 for localization. The initial map can be stored in the map 156. The DPS 102 can transmit data from the map 156 to the server 160 to update the remote map 176. The remote map 176 can be used to localize vehicles with different platforms.

Landmarks can be presented in a graph. For example, each node can be the endpoint of a landmark, and each edge can hold information between two landmarks, such as traveling distance, sample distance of the road profile, vehicle vertical displacement data, road height data, lateral displacement data, and other distance related information to localize the vehicle 101. An example of the graph, adding data, and updating the graph can be seen in FIG. 7.

The terrain comparator 136 of the DPS 102 can conduct a comparison between a current road profile generated by the road profile generator 128 and a historical road profile retrieved from the road profile storage 152. In some cases, the historical road profile can be loaded or retrieved from the remote road profile 172. The comparison between the current road profile and the historical road profile can improve vehicle localization. The retrieved historical road profile can be stored in road profile storage 152. In some implementations, the terrain comparator 136 can compare the current road profile directly to the historical road profile stored in the remote road profile 172. The terrain comparator 136 can utilize a terrain comparator 136 to determine a match between the current road profile and the historical road profile. The terrain comparator 136 can associate the location of the vehicle 101 with a location associated with the historical road profile in response to a match between the two road profiles.

The terrain comparator 136 can determine a match between the historical road profile and the current road profile at a second location that aligns with the lateral deviation. The second location can refer to a location associated with a landmark of the map 156. The landmark can include vertical displacement data of one or more vehicles in the spatial-domain. With spatial-domain, data can be compared without timing variation. The second location can be subsequent to the first location.

The terrain comparator 136 can determine the match between at least two road profiles by determining similarities between two N-by-L arrays, each corresponding to a road profile. A match between the road profiles can be based on a matching performance (e.g., match score or similarity score). The terrain comparator 136 can determine that the road profiles are a match in response to the match score satisfying or exceeding a predetermined threshold (e.g., 90%, 95%, or 99% match score). The terrain comparator 136 can evaluate the match score by using the road profiles as input into, for example, a confusion matrix or an error matrix. The terrain comparator 136 can utilize the confusion matrix to minimize false positive and false negative in the comparison. At least one of the approaches of the confusion matrix can be used to compare the road profiles.

A first example of the confusion matrix can include a correlation matrix. The terrain comparator 136 can utilize the following equation:

$$\text{Similarity} = a'^{*}b / \sqrt{a'^{*}b} / \sqrt{b'^{*}b}$$

For the purposes of this example, the current road profile can correspond to variable "a" and the historical road profile can correspond to variable "b," which can be assumed to be N-by-1 arrays. By utilizing the confusion matrix, the terrain comparator 136 can generate value (e.g., match score) between −1 and 1. A match score closer to 1 indicates a true positive, and a match score of −1 indicates a true negative. The DPS 102 can include a predetermined threshold, such as 0.85, 0.90, or 0.95. In response to the match score satisfying or exceeding the threshold, the terrain comparator 136 can determine that the current road profile matches the historical road profile at a second location.

The terrain comparator 136 can utilize other confusion matrixes and processes to determine a match score, such as dynamic time warping (e.g., measures similarity between two temporal sequences, which may vary in velocity) or a neural network (e.g., Siamese neural network). As an example, the terrain comparator 136 can provide the current road profile and the historical road profile as inputs for the Siamese neural network. The Siamese neural network can feed the two road profiles as inputs into the same encoder, such as a Convolutional Neural Network ("CNN"). The Siamese neural network can compare a distance between the outputs of the CNN to determine if the inputs are similar or different.

In some implementations, responsive to the terrain comparator 136 comparing the current road profile to the historical road profile associated with a first landmark and determining a similarity score, the DPS 102 can update, responsive to the score satisfying a similarity threshold, the historical vertical displacements of the historical road profile at the landmark of the map 156 using the plurality of vertical displacement signals received at the landmark. In some other implementations, the DPS 102 can remove, responsive to the score not satisfying the similarity threshold, the first landmark from the landmarks of the historical road profile.

In some implementations, the DPS 102 can determine a current location of the vehicle 101 in an offline state. For example, the vehicle may be in an area without signals from the satellites. The DPS 102 can continue to update the location of the vehicle 101 based on road profile matching. The DPS 102 can provide an indication of the current location of the vehicle 101 as the location corresponding to the matched historical road profile, such as a second location different from the first location determined by the positioning sensor. The DPS 102 can provide an indication that the positioning sensor is in an offline state.

For example, one or more 1D signals can be used for the Siamese neural network, aside from images. The DPS 102 can replace CNN with Long short-term memory ("LSTM") as the encoder. The terrain comparator 136 can use a deep learning structure by converting the one or more 1D signals into an image. By converting the 1D signals of, for example, the current road profile and the historical road profile, the terrain comparator 136 can generate scalograms for road profile to obtain two images. Thereinafter, the terrain comparator can train and use standard CNN-base siamese networks to determine a match between road profiles. Thereafter, the terrain comparator 136 can provide, responsive to the match between the current road profile and the historical road profile, an indication of a current location of the vehicle 101 as the second location stored in the historical road profile that aligns with the lateral deviation. The second location can correspond to a landmark of the map 156. The lateral deviation can indicate at least the lane occupied by the vehicle 101 and the distance of the vehicle 101 from the center of the lane. The indication of the current location of the vehicle 101 can be displayed on the display device 112.

In some implementations, the historical road profile of the ground can include a first landmark and a second landmark, where the second landmark is located a predetermined distance from the first landmark, for example. The vehicle 101 may be at the first landmark. The second landmark can be associated with the historical road profile at a next location. The DPS 102 can determine, using longitudinal velocity data received from the one or more sensors 108 of the vehicle 101, a travel distance of the vehicle from the current location. The travel distance indicative of the vehicle 101 approaching the second landmark at the predetermined distance from the first landmark. Hence, the DPS 102 can provide the historical vertical displacements of the historical road profile at the second landmark to a controller 140 of the vehicle to cause the controller 140 to control at least one component of the vehicle 101 based on the historical vertical displacements of the historical road profile at the second landmark.

In some implementations, and further from the above example, the DPS 102 can generate, responsive to the vehicle 101 located at the predetermined distance from the current location associated with the first landmark, a second landmark having a second set of vertical displacement signals received from the one or more sensors 108. The second landmark can be located at the predetermined distance after the current location. In this case, the DPS 102 can update, using the second set of vertical displacement signals at the second landmark, one or more landmarks with the second landmark and the historical vertical displacements of the historical road profile at the second landmark.

In some implementations, the DPS 102 can combine the aforementioned localization technique (e.g., terrain-based localization) with one or more other localization techniques to improve localization results. In this case, the DPS 102 can provide the terrain-based localization technique using at least the sensor data 148, the road profile stored in the road profile storage 152, and the map data, as "sensors" that report an accurate location when the road profile matches a landmark. The DPS 102 can provide the indication of the current location to other localization techniques, as many localization techniques (e.g., Extended Kalman Filter, Graph-based optimization, and Particle Filtering) are based on fusing different sensor data. Thus, the terrain-based localization can be provided as an additional sensor to any general sensor data fusion framework to further improve vehicle localization. With the terrain-based localization, even in areas where GPS reception is not available, the DPS 102 can update the location of the vehicle 101 without losing accuracy.

The controller 140 of the DPS 102 can transmit instructions to vehicle systems, such as the brake system, the suspension system, and the steering system. The controller 140 can provide instructions to at least one of the vehicle systems based on the sensor data, the vertical vehicle displacement data, the road height, the road profile, and other data derived from the sensor data 148. The instructions for the vehicle systems can be stored in the data repository 144. The instructions can include adjusting the braking coefficient level of the brake system, the dampening level of the suspension system (e.g., for semi-active suspension), a height level of the suspension system (e.g., for active suspension), and a steering direction and resistance of the steering system. The controller 140 may process data received from the components of the DPS 102 and the sensors 108 to determine an instruction to provide to a vehicle system. For example, the map 156 can include a first landmark and a second landmark separated by a distance (e.g., 100 meters). The second landmark may be an obstruction, such as a pothole or a bump. The DPS 102 can compare a current road profile and a historical road profile associated with the first landmark. Responsive to a match between the current road profile and the historical road profile, the DPS 102 can determine that a vehicle 101 is approaching the obstruction. The controller 140 can access the control program from the data repository 144 to retrieve an instruction corresponding to the obstruction indicated by the second landmark. Based on a data structure of the control program, the controller 140 can receive an instruction to configure one or more vehicle systems to assist a driver of the vehicle 101 in mitigating, resisting, or evading the obstruction, for example.

The controller 140 can transmit instructions to the suspension system of the vehicle 101. The suspension system can include active suspension, semi-active suspension, or adaptive suspension. The DPS 102 can utilize the sensor data (e.g., image data, lateral deviation data, and other data from the sensors 108) and the terrain-based localization technique to memorize and predict one or more motions (e.g., vertical displacement data) of the vehicle 101 on a mapped road. The sensor data and the localization technique can be used for preview-based suspension control and one or more in-vehicle stabilization systems (e.g., desk, bed, cupholder, etc.) based on the motions of the vehicle 101 while traversing on the road. Based on the predicted motions of the vehicle 101 associated with one or more locations on the map 156, the controller 140 can transmit instructions to one or more vehicle systems to stabilize the vehicle 101 and objects within the vehicle 101. The stabilization can refer to canceling out the motion induced by the road surface.

The controller 140 can transmit instructions to other components in the system 100, such as the IMU 104, the sensors 108, and the display device 112. The controller 140 can transmit a code or a data package to the IMU 104 and the sensors 108, for example, to update the firmware of the sensors 108. The controller 140 can provide instructions to the display device 112, for example, to display the location of the vehicle 101 and vehicle information.

The controller 140 can relay instructions from the server 160 to the vehicle systems. For example, the DPS 102 can transmit sensor data 148 to the server 160 for processing via the network 103. The server 160 can generate a current road profile using similar techniques and features as the DPS 102. The server 160 can transmit the generated current road profile to the DPS 102 for initiating at least one instruction via the controller 140. The server 160 can update the historical road profile stored in the remote road profile 172 with the generated current road profile.

The data repository 144 of the DPS 102 can include sensor data 148, road profile storage 152, and map 156. The sensor data 148 can store sensor data measured by the IMU 104, the sensors 108, and built-in sensors of the vehicle 101. The sensors 108 can include at least a range sensor, a positioning sensor, and an imaging sensor. The built-in sensor data can include the speed, wheel rotation speed, brake level, dampening level, or any data related to the vehicle system or mobility of the vehicle 101. The DPS 102 can utilize the sensor data 148, for example, to determine the lateral deviation of the vehicle 101 and an initial location of the vehicle 101, and to generate a road profile at a first location. In some cases, the initial location can be the first location.

The road profile storage 152 can store one or more road profiles generated by the road profile generator 128. The road profile storage 152 can store information related to the road profile, such as vertical displacement data, road height data, lane index or identifier ("ID"), lateral deviation data, and other data used to generate the road profile. In some implementations, the DPS 102 can retrieve a historical road profile from the server 160. The DPS 102 can store the historical road profile in the road profile storage 152.

The map 156 can include map data associated with the location of the vehicle 101. For example, the map data can include an area around the location of the vehicle 101. The radius of the area can be predetermined, such as 5 miles, 10 miles, or 20 miles. The DPS 102 can retrieve or update the map 156 by consulting the remote map 176 on the server 160 via the network 103. The map data can include a route of the vehicle 101. The DPS 102 can determine the route based on an initial location of the vehicle 101 and the direction the vehicle 101 traverses on the road, for example. The route can include one or more landmarks for comparison between live data from the vehicle 101 and map data (e.g., historical road profile) to determine a current location of the vehicle 101. In some implementations, the map 156 can include map data extending from the initial location of the vehicle 101 to a destination of the vehicle 101. The destination may be determined by an operator or driver via a navigator. The navigator can be a built-in component in the vehicle 101. The operator can interact with the navigator, such as to set up a route, via the display device 112.

The historical road profile can include one or more landmarks. Each landmark of the landmarks can include one or more location indexes and one or more lane identifiers identifying at least one lane occupied by the one or more vehicles that generated the historical road profile. The road profile generator 128 can generate a current road profile with a location index and a lane identifier. The terrain comparator 136 can match the location index and the lane identifier with ones from the historical road profile. The terrain comparator 136 can compare the current road profile and the historical road profile having the same location index and the lane identifier. The lateral deviation can identify a distance of the vehicle 101 from the center of the lane and the lane occupied by the vehicle. Therefore, the lateral deviation can be used to determine the lane index for the current road profile and the historical road profile.

The data repository 144 can include vehicle configuration information, one or more models, and control programs. The vehicle configuration information can store data related to configurations of the vehicle 101, such as a make, a model, a track width, fuel efficiency rating, versions of the vehicle systems, or any information specific to the vehicle 101. The model can include a state-space model generated by the terrain processing component 120 including a roll angle processing component and a surface detection component. The state-space model can include sensor data, built-in sensor data, and bias measurement. The terrain processing component 120 can store at least one state-space model in the data repository 144. The state-space model can be accessed by one or more components of the DPS 102 to generate a road profile. The control programs can include one or more instructions to control one or more vehicle systems, such as the brake system, the steering system, and the suspension system. For example, the instructions can include adjusting the braking coefficient in the brake system, the feedback force applied to the steering system, the dampening force in the semi-active suspension system, and the suspension level or height in the active suspension system.

The system 100 can include a server 160 connected to the DPS 102 via a network 103. The server 160 can include at least a road profile manager 164 and a remote data repository 168. The remote data repository 168 can include remote road profile 172 and remote map 176. The road profile manager 164 can manage incoming and outgoing road profiles. The server 160 can perform one or more similar features and functionalities as one or more components of the DPS 102, such as the terrain processing component 120, the domain transformer 124, the road profile generator 128, the map manager 132, and the terrain comparator 136. The server 160 can receive data from the DPS 102 for processing. The server 160 can determine road heights and vehicle vertical displacement data at a location of the vehicle 101 and generate a road profile similar to the DPS 102.

The road profile manager 164 may accept or discard the road profile from the vehicle 101. For example, the road profile manager 164 can determine that the incoming road profile is identical to the current road profile at a location of the vehicle 101. In response to this determination, the road profile manager 164 may not update the remote road profile 172 and discard the incoming road profile data. The road profile manager 164 may also discard incoming road profiles based on the inaccuracy of the road profile in comparison to the road profiles (e.g., from multiple vehicles) stored in the remote road profile 172. In another example, the road profile manager 164 can send at least one road profile from the remote road profile 172 to one or more vehicles in response to an update to a road profile. The road profile manager 164 can determine to send an update based on a threshold of minor updates (e.g., recorded cracks on a location, drought-stricken areas, flooded area, lane constructions, etc.). The threshold can refer to the number of minor updates used by the road profile manager 164 to send an update to one or more vehicles. For example, the threshold can be a predetermined number, such as 50, 100, or 200 minor updates. In another example, the threshold can refer to a determination of risk towards the safety, comfort level for operators, or probability of damages to one or more vehicles at various locations. In some cases, the road profile manager 164 can transmit an updated road profile to update the vehicle 101 based on the vehicle 101 having an outdated road profile. For example, the vehicle 101 may store an old road profile having an obstruction at a location. The server 160 can determine that an updated road profile does not include the obstruction. Accordingly, the server 160 can transmit the updated road profile to the vehicle 101.

The road profile manager 164 can determine to combine the road profile generated from the DPS 102 with at least one road profile stored in the remote road profile 172. The at least one road profile stored in the remote road profile 172 can be referred to as a historical road profile. The road profile manager 164 can confirm the domain of the road profile data, such as temporal-domain or spatial-domain. For example, if the road profile manager 164 receives a road profile in the temporal-domain from the DPS 102, the road profile manager 164 can convert the road profile from the temporal-domain to the spatial-domain using the sensor data 148 from the DPS 102. Furthermore, the road profile manager 164 can determine that the DPS 102 removes suspension bias of the vehicle 101 from the data. Therefore, the road profile received from the DPS 102 in spatial-domain can be used by one or more vehicles with different configurations and suspension systems.

The remote data repository 168 can be referred to as a centralized data repository. The remote data repository 168 can include features similar to the data repository 144 of at least the vehicle 101. The remote road profile 172 can include similar features to the road profile storage 152 of the vehicle 101. In some cases, the road profile storage 152 of the vehicle 101 can be mapped or synced to the remote road profile 172 with the latest updated information. The remote road profile 172 can store road profiles of multiple vehicles. The road profile manager 164 can determine to store new information from a vehicle 101 and send updates to other vehicles based on the relevancy or importance of the new information to the status and location of each of the other vehicles. The relevancy or importance can be determined based on the locations of the other vehicles and the road surface condition.

The remote map 176 can include similar features to the map 156 of the DPS 102. The remote map 176 can store map data worldwide. The remote map 176 can include landmarks across the map worldwide. The landmarks can be set based on unique vertical displacement data or road height. In some cases, the landmarks may be set based on a predetermined distance, such as 50 m, 100 m, or 200 m from the next or the previous landmark. In some implementations, the remote map 176 may not set the landmarks. Instead, as an example, the DPS 102 can set one or more landmarks on the map 156, which may be transmitted to the server 160 to update the remote map 176. In this example, the DPS 102 can set the landmarks as an incremental distance for vehicle localization, such as every 50 m, 100 m, or 200 m. The landmarks are used as indications of locations. For example, the DPS 102 can compare the current road profile to the historical road profile associated with a landmark. The DPS 102 can determine that the vehicle 101 is at the location corresponding to the landmark responsive to a match between the road profiles.

The remote map 176 can be updated based on data from any sources, such as one or more vehicles, the satellites, and from administrator input into the server system. The remote map 176 can be updated automatically. The DPS 102 can consult the remote map 176 to update the map 156. In some implementations, responsive to the DPS 102 generating a road profile, the DPS 102 can update the map 156 with the road profile information. The DPS 102 can transmit the map 156 updated with the road profile to the server 160. The server 160 can determine new information from the map 156 and update a portion of the remote map 176 with additional data.

Referring to FIGS. 2A-F, example illustrations of mounting locations of sensors on a vehicle are shown, in accordance with an implementation. The illustration 200 can include multiple sensors, such as sensors 204, 208, 212, 216, 220, and 224. These sensors can refer or correspond to at least one of the sensors 108. For example, sensor 204 can refer to an IMU 104, sensor 208 and sensor 212 can refer to a first range sensor and a second range sensor, sensor 216 can refer to a positioning sensor, and sensor 220 and sensor 224 can refer to a first imaging sensor 220 and a second imaging sensor 224. The sensors 204, 208, 212, 216, 220, and 224 can perform similar functionalities and features as the sensors shown in FIG. 1. The illustration 200 can include lateral axis 236 indicating an axis from the left side to the right side of the vehicle 101. The illustration 200 can include a longitudinal axis 240 indicating an axis from the front of the vehicle 101 to the rear of the vehicle 101 or from a distal end 244 to a proximal end 248 of the vehicle 101. The distal end 244 of the vehicle 101 can be referred to as the front of the vehicle 101. The proximal end 248 of the vehicle 101 can be referred to as the rear of the back of the vehicle 101. The illustration 200 can illustrate the center tread width of the wheels of the vehicle 101, such as the center tread width 228 of a left wheel of the vehicle 101 and the center tread width 232 of the right wheel of the vehicle 101.

Figure 2A:
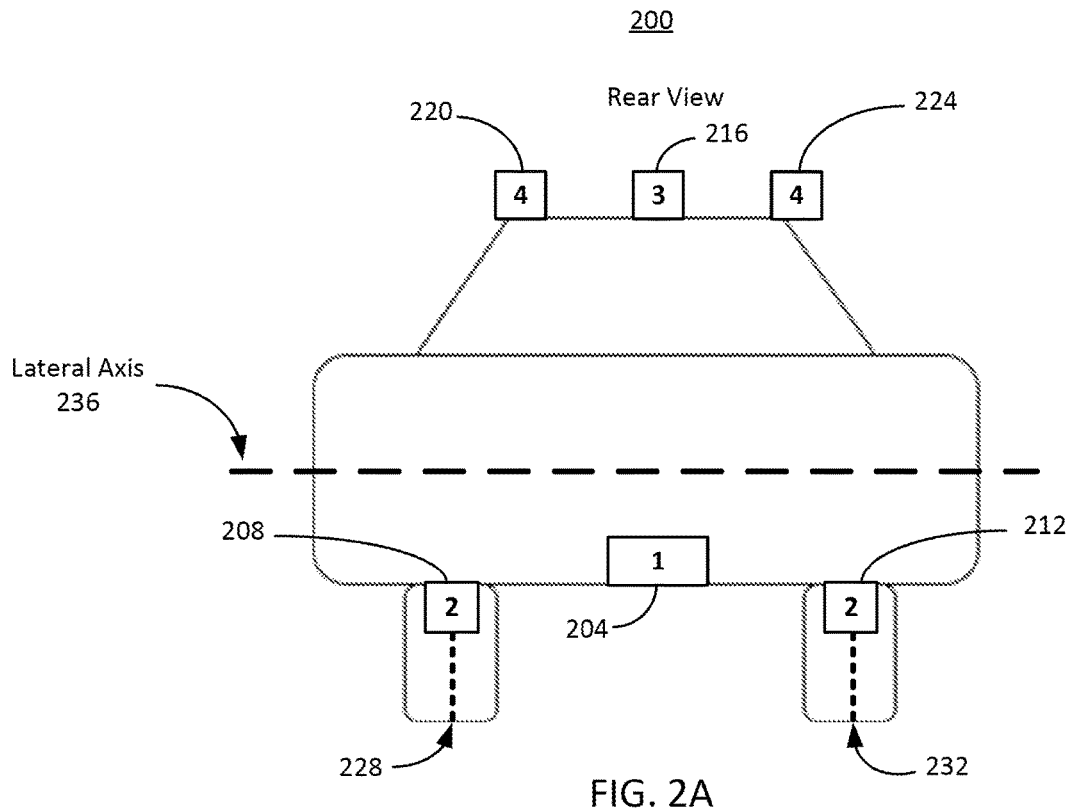
FIGS. 2A-F are example illustrations of mounting locations of sensors on a vehicle, in accordance with an implementation.

Referring now to FIG. 2A, the mounting position of each sensor can be shown. The IMU 204 can be mounted at the center of the lateral axis 236 of the vehicle 101. The IMU 204 may be located at the portion of the rear of the vehicle 101, for example. The first range sensor 208 and the second range sensor 212 can be mounted lower than the IMU 204. The first range sensor 208 can be mounted adjacent to the center tread width 228 of the left wheel of the vehicle 101. The second range sensor 212 can be mounted adjacent to the center tread width 232 of the right wheel of the vehicle 101. The positioning sensor 216 may be mounted on top of the vehicle 101 or embedded inside the vehicle 101 as a built-in sensor. The first imaging sensor 220 and the second imaging sensor 224 can be mount at the front of the distal end 244 of the vehicle 101 to detect road images in front of the vehicle 101. In some cases, an imaging sensor of the sensors 108 can receive rear images of at the proximal end 248 of the vehicle 101.

Figure 2B:
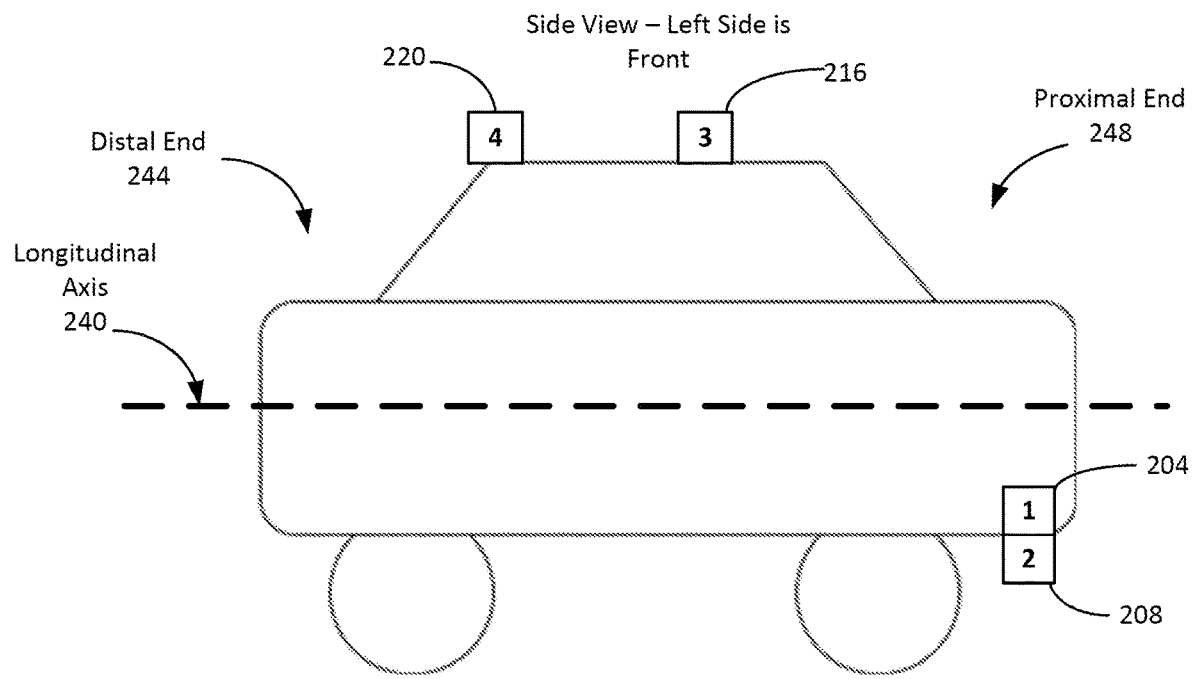
Figure 2C:
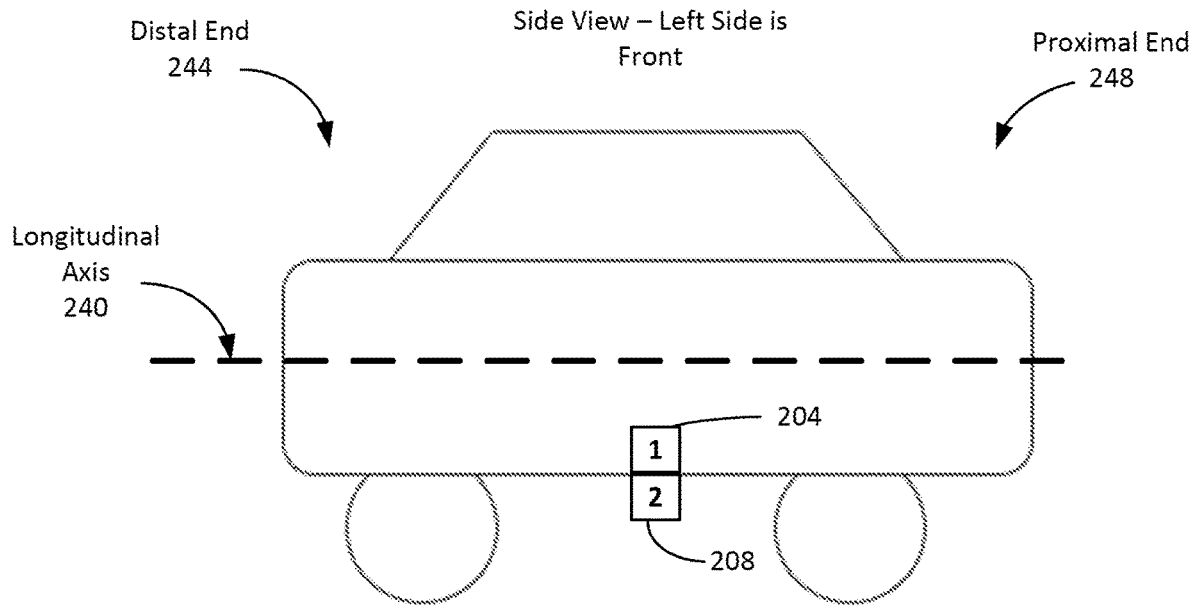
Figure 2D:
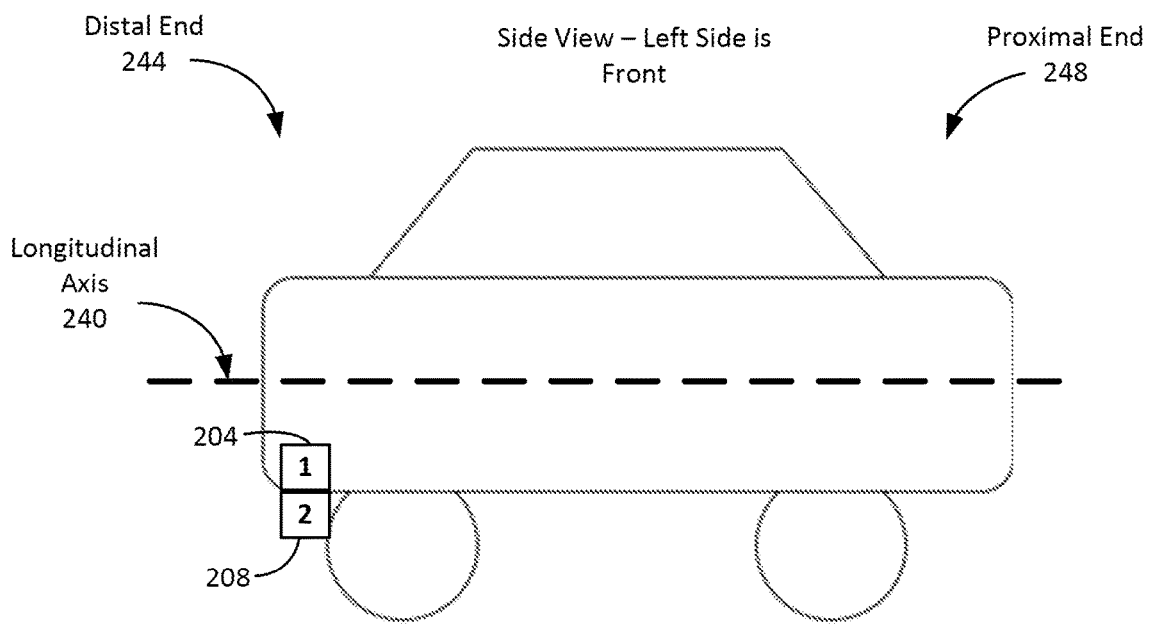

Referring now to FIG. 2B, the IMU 204 can be located at the proximal end 248 of the vehicle 101. The first range sensor 208 can be mounted lower than the IMU 204 at the same lateral axis 236 as the IMU 204. The second range sensor 212 can be mounted similar to the first range sensor 208, but on the right wheel of the vehicle 101. The mounting location of each sensor can vary. For example, and referring now to FIG. 2C, the IMU 204 may be mounted at the center of the longitudinal axis 240 of the vehicle 101. The IMU 204 can be mounted in any location along the longitudinal axis 240 of the vehicle 101 between the distal end 244 and the proximal end 248. As the IMU 204 is between the distal end 244 and the proximal end 248, the first range sensor 208 and the second range sensor 212 can be mounted at the same lateral axis 236 as the IMU 204 between the distal end 244 and the proximal end 248. Referring now to FIG. 2D, the IMU 204, the first range sensor 208, and the second range sensor 212 can be mounted at the distal end 244 of the vehicle 101. The IMU 204 and the range sensors can be mounted in the same lateral axis 236.

Figure 2E:
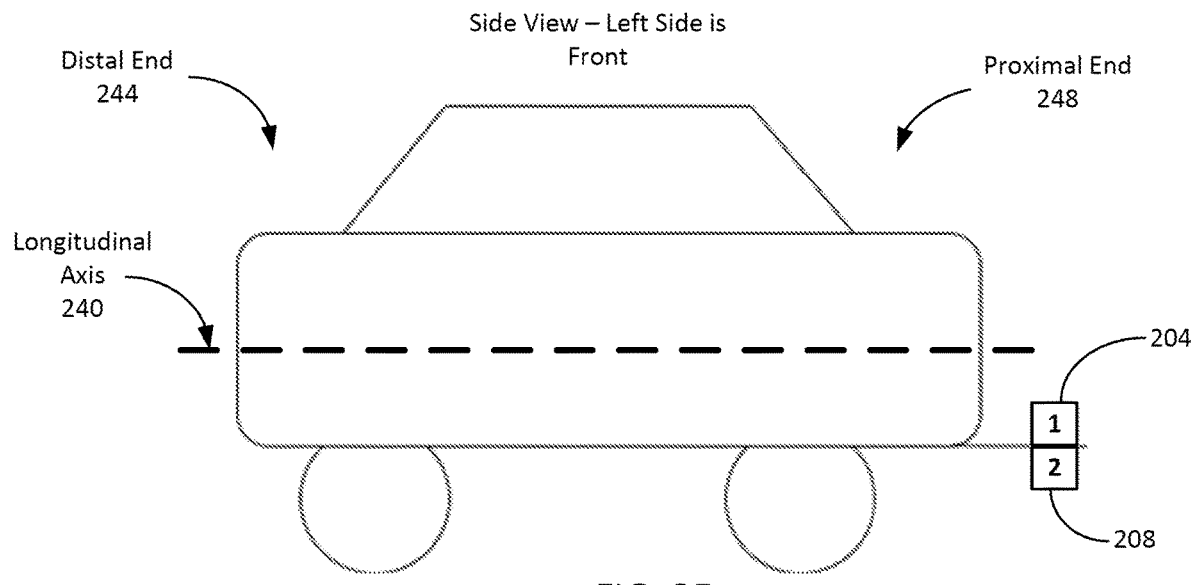
Figure 2F:
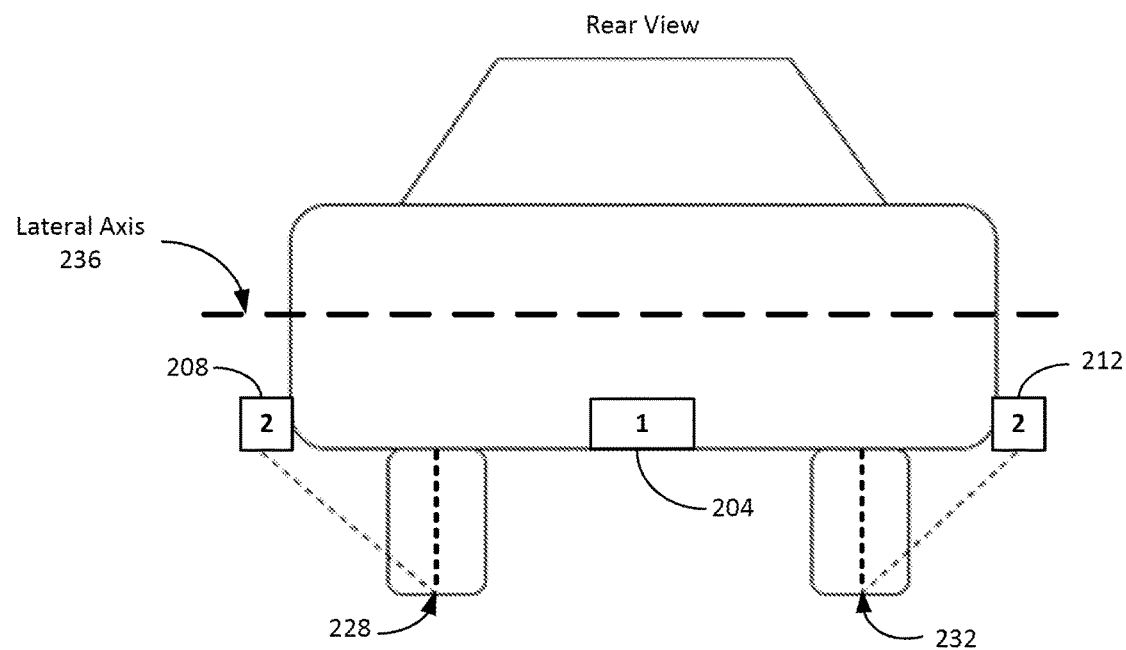

Referring now to FIG. 2E, the vehicle 101 may include an extension at the rear of the vehicle 101. the IMU 204, the first range sensor 208, and the second range sensor 212 can be mounted at the extension portion of the vehicle 101 further from the proximal end 248 of the vehicle 101. In some implementations, and referring to FIG. 2F, the first range sensor 208 and the second range sensor 212 may be mounted at the left side and the right side of the vehicle 101, respectively. The range sensors can be mounted, such as to detect or measure a distance from the range sensors to the center tread width of a wheel in contact with the ground. In this case, the first range sensor 208 can be mounted on the left side of the vehicle 101 pointing to the bottom of the center tread width 228 of the left wheel in contact with a first portion of the ground. The second range sensor 212 can be mounted on the right side of the vehicle 101 pointing to the bottom of the center tread width 232 of the right wheel in contact with a second portion of the ground. Based on the mounting position of the range sensors, the DPS 102 can receive vehicle vertical displacement data to generate a road profile of the vehicle 101. The sensors 108 mounting positions can be similar to one or more vehicles with different configurations than the vehicle 101. The sensors 108 on the one or more vehicles can perform similar features and functionalities as the sensors 108 on the vehicle 101.

Figure 3:
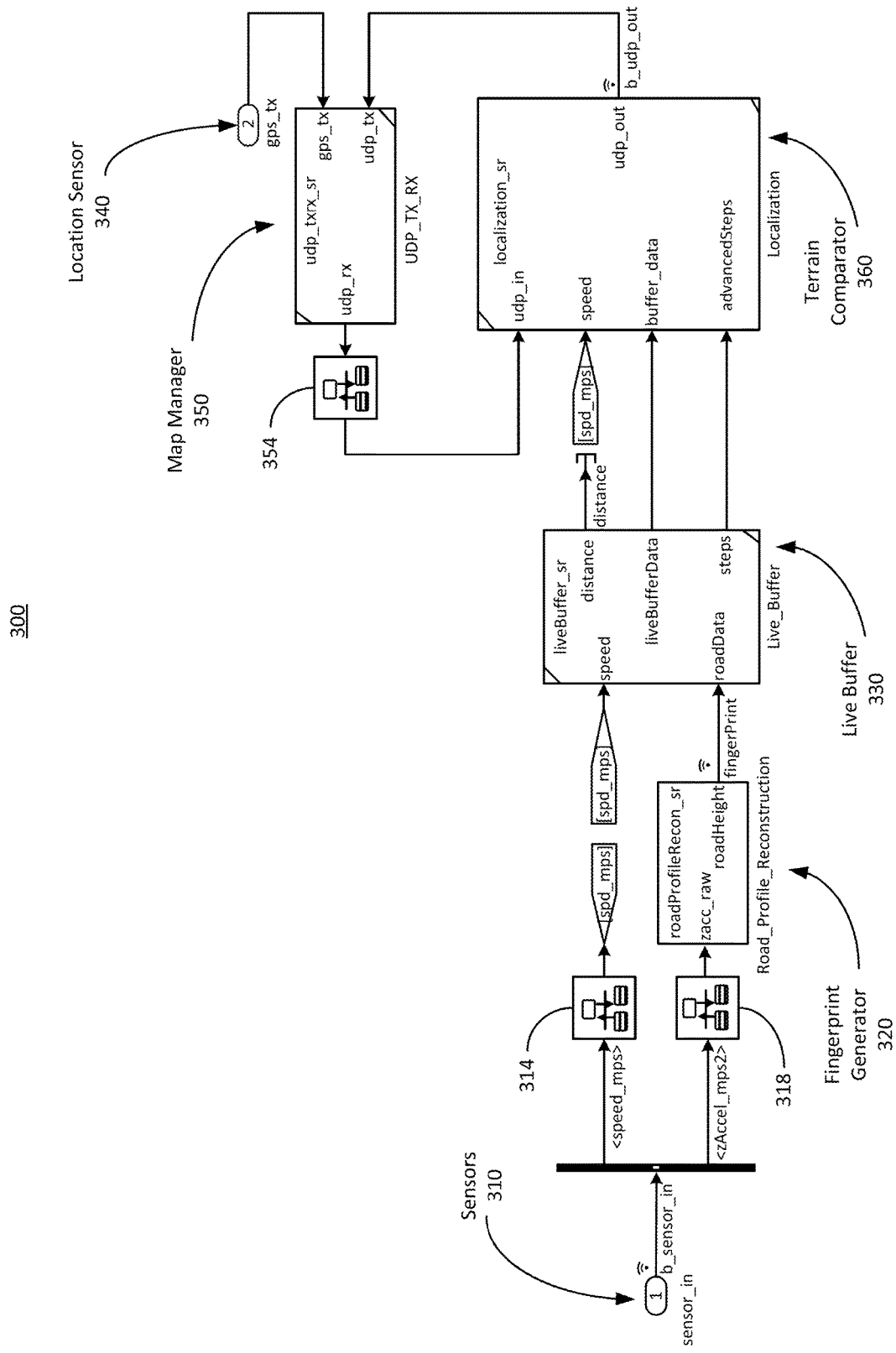
FIG. 3 is a schematic diagram of an example system to localize the vehicle, in accordance with an implementation.

Referring to FIG. 3, an example schematic diagram of a system 300 to localize the vehicle is shown, in accordance with an implementation. The system 300 can include one or more components similar to system 100. The system 300 can include one or more sensors 310, a fingerprint generator 320, a live buffer 330, a location sensor 340, a map manager 350, a terrain comparator 360, and normalizers 314, 318, and 354. The components of system 300 can perform similar features and functionalities as components of system 100. For example, the sensors 310 can include the features of sensors 108, the fingerprint generator 320 can include the features of rod profile generator 128, the live buffer 330 can include the features of domain transformer 124, the map manager 350 can include the features of map manager 132, and the terrain comparator 360 can include the features of terrain comparator 136. The components of system 300 can be a part of the DPS 102, such that the DPS 102 can utilize the one or more components for vehicle localization.

The sensors 310 can include components similar to sensors 108, such as an accelerometer, a gyroscope, an IMU 104, one or more range sensors, an imaging sensor, and a positioning sensor (e.g., location sensor 340). The sensors 310 can receive sensor data 148 similar to the sensors 108. The sensor data 148 can be stored in the data repository 144. For example, the sensors 310 can receive vertical velocity data, longitudinal velocity data, roll angle velocity data, lateral velocity data, and pitch angle velocity data. The sensors 310 can receive acceleration data associated with each of the velocity data. The sensors 310 can receive displacement data, such as vertical displacement data and lateral displacement data of the vehicle 101. The vertical displacement data can correspond to the height of each side of the vehicle 101. The lateral displacement data can correspond to the location of the vehicle 101 from the center of the lane. In some cases, the lateral displacement data can indicate which lane the vehicle 101 resides. In some cases, the DPS 102 can derive the acceleration data from the velocity data, or vice versa.

The DPS 102 can filter the sensor data 148 via normalizers 314 and 318, for example. The DPS 102 can normalize or filter the sensor data 148 prior to storage in the data repository 144. The DPS 102 can normalize the sensor data 148 at a predetermined longitudinal velocity or longitudinal acceleration to remove the effect of varying velocities for one or more vehicles. The longitudinal velocity can be predetermined to, for example, 15 m/s, 25 m/s, or other speed depending on the traffic, the road, or the location of the vehicle. For example, the longitudinal speed can be 50 m/s on a highway, 30 m/s in residential areas, and 10 m/s in a school zone. The longitudinal acceleration can be predetermined similar to the longitudinal velocity. The DPS 102 can pass the sensor data 148 from the sensors 310 to the fingerprint generator 320 responsive to the normalization. In some cases, the normalized sensor data can be passed to the live buffer 330 prior to the fingerprint generator 320.

The fingerprint generator 320 can be referred to as a road profile generator, similar to the road profile generator 128. The road profile may be referred to as fingerprints of the road. The functionalities of the road profile generator 128 can be incorporated in the fingerprint generator 320. The DPS 102 can use the fingerprint generator 320 to generate, for example, a current road profile based on the sensor data 148. The sensor data 148 may be raw data directly from the sensors 310 or normalized from the sensors 310. For example, the DPS 102 can perform road profile reconstruction using vertical vehicle displacement data. The DPS 102 may filter the suspension effect of the vehicle 101 or one or more vehicles from the vertical vehicle displacement data, such that the data can be centralized for all vehicles. In another example, the DPS 102 can perform road profile reconstruction using road heights. By using the road heights, the road profile may not include suspension configuration as a factor.

The fingerprint generator 320 can use the following input signals to generate a road profile:
1) Vehicle longitudinal speed (can be read from Controller Area Network ("CAN") of a vehicle 101, for example, at 50 Hz from an anti-lock braking system ("ABS") of the vehicle 101)
2) GPS or Real-Time Kinematic ("RTK") GPS for the relevant location of the vehicle 101.
3) IMU 104 mounted in the vehicle 101.
4) One or more range sensors to measure the vehicle vertical displacement between the vehicle body and the ground surface.

The fingerprint generator 320 may utilize other sensor data 148, such as acceleration data from accelerometers mounted at the top and the bottom of each suspension of the vehicle 101. The fingerprint generator 320 can utilize normalized vertical velocity data, vertical displacement data, normalized pitch angular velocity data, pitch angle data, normalized roll angular velocity data, and roll angle data from the sensors 310 for generating the road profile. The fingerprint generator 320 can utilize the above data to generate a current road profile of the vehicle 101, similar to the road profile generator 128.

The live buffer 330 can perform similar features and functionalities as the domain transformer. The live buffer 330 can receive the velocity data from the sensors 310. The live buffer 330 can receive the road profile generated by the fingerprint generator 320. The live buffer 330 can perform a domain conversion to convert data from temporal-domain to spatial-domain, and vice versa. The live buffer 330 may not convert data that are already in the spatial-domain. An example of an interpolation process for converting the data from temporal-domain to spatial-domain can be seen in FIG. 4. The live buffer 330 can pass at least distance data, live buffer data (e.g., road profile converted to spatial-domain), and one or more instructions to the terrain comparator to compare the road profile generated by the fingerprint generator 320 to a historical road profile corresponding to a landmark retrieve from the map 156 via the map manager 350.

In some implementations, the DPS 102 can convert, via the live buffer 330, the sensor data 148 from the sensors 310 prior to generating a road profile. For example, the fingerprint generator 320 component can be placed after the live buffer 330. In this case, the DPS 102 can pass the sensor data 148 from the sensors 310 to the live buffer 330 for conversion. Once converted, the live buffer 330 can transmit the data in spatial-domain to the fingerprint generator 320. The fingerprint generator can then convert the sensor data in a spatial-domain to a road profile. In some implementations, the fingerprint generator 320 can incorporate one or more features of the live buffer 330. In this case, the fingerprint generator 320 and the live buffer 330 can be the same component, and perform the features of both components simultaneously.

The DPS 102 can obtain an initial or a first location of the vehicle 101 via the location sensor 340. The first location of the vehicle 101 can refer to the location at the start of a route. The first location can be determined prior to the vehicle 101 traversing the road. For example, the location sensor 340 can receive location data from satellites upon ignition of the vehicle engine. The location sensor 340 can pass the first location data to the map manager 350 to retrieve a map 156 for the vehicle 101. The map 156 can include one or more landmarks associated with a historical road profile to determine the location of the vehicle 101.

The map manager 350 can receive location data from the location sensor 340. The location data can indicate a first location of the vehicle 101. The map manager 350 can perform features and functionalities similar to the map manager 132. For example, responsive to receiving the first location of the vehicle 101, the map manager 350 can retrieve map data at a predetermined radius from the first location, such as 5 miles, 10 miles, or 25 miles. The map data can include one or more landmarks associated with a historical road profile (e.g., historical vertical displacement data). The landmark can indicate a precise location on the map 156 for vehicle localization. In some cases, the one or more landmarks can be separated based on the features of the historical road profile, such as obstacles for the vehicle 101 to control at least one vehicle system. In some cases, the one or more landmarks can be separated by a predetermined distance, such as every 100 m, 200 m, or 500 m, depending on the traffic, the location, and the route distance.

In some implementations, the map manager may retrieve only a predetermined number of landmarks for the DPS 102 to compare with a current road profile. For example, at a first location, the map manager 350 may retrieve a first landmark at a second location located at a predetermined distance from the first location. The first landmark can correspond to a second location on the map 156. Responsive to approaching, arriving at, or passing the first landmark, the map manager 350 may subsequently retrieve a second landmark. The second landmark can correspond to a third location on the map 156. The map manager 350 can transmit the map data including the landmarks and the historical road profile to the terrain comparator 360. The map data may be normalized to a predetermined longitudinal speed via normalizer 354. The normalization process can be similar to normalizing the sensor data 148 by the normalizer 314 and 318. The DPS 102 can determine whether a current road profile matches the historical road profile. An example of landmark locations can be shown in at least FIG. 5. An example of mapping, adding, or updating of the landmarks can be shown in at least FIGS. 7A-B.

The terrain comparator 360 can perform features and functionalities similar to the terrain comparator 136. The terrain comparator 360 can receive data from the live buffer 330 and the map manager 350, including the map data, the vehicle velocity data, the road profile (e.g., live buffer data), and discretization steps from the live buffer 330 to compare the current road profile and the historical road profile. The discretization steps can be used to determine whether to compute new data, as described in further details in FIG. 4. In some cases, the live buffer 330 can send instructions to the terrain comparator 360 to initiate a comparison between the current road profile and the historical road profile. In some implementations, prior to retrieving the historical road profile, the live buffer 330 can instruct the terrain comparator 360 to retrieve the landmark having the historical road profile corresponding to a first location of the vehicle 101. In the case of the fingerprint generator 320 generating the current road profile after the live buffer 330 convert the data from temporal-domain to spatial-domain, the fingerprint generator 320 can send the instructions to the terrain comparator 360.

The terrain comparator 360 can compare the current road profile and the historical road profile using at least one matching algorithm or a confusion matrix, for example, a correlation matrix, a dynamic warping, and Siamese neural network. The terrain comparator 360 can determine a match between the current road profile and the historical road profile based on a similarity score. For example, using the matching algorithm, the terrain comparator 360 can determine a similarity score between the two road profiles. Response to the similarity score exceeding a threshold, such as 85%, 90%, or 95%, the terrain comparator 360 can determine that the road profiles matched. Once matched the terrain comparator 360 can send a confirmation or an acknowledgment to the map manager 350 that the current road profile match with a landmark corresponding to the historical road profile. In this case, the map manager can add, remove, or update the landmark.

The terrain comparator 360 can continuously receive the historical road profile or map data including historical vertical vehicle displacement data. The historical vertical vehicle displacement data can refer to vertical displacement data from one or more vehicles. The one or more vehicles can include the vehicle 101. In some cases, the one or more vehicles may not include the vehicle 101. In some implementations, the terrain comparator 360 can continuously match the current road profile generated as the vehicle 101 traverses the road with the historical road profile associated with the route the vehicle 101 travels on. The terrain comparator 360 can determine to add one or more landmarks (e.g., data point) to the map 156. Therefore, the map 156 can include a new landmark with the current road profile as the historical road profile associated with the new landmark.

In response to matching the current road profile to the historical road profile corresponding with an existing landmark, the terrain comparator 360 may update the landmark with an edge indicating a positive match of the landmark. The terrain comparator 360 can combine the historical road profile corresponding to the landmark with the current road profile. The terrain comparator 360 may not combine the current road profile with the historical road profile. Instead, the terrain comparator 360 may remove the current road profile or replace the historical road profile with the current road profile.

In some implementations, the DPS 102 can transmit an updated map data to the server 160 via the network 103. The server 160 can determine, via the road profile manager 164, whether to add the current road profile to the remote road profile 172 as a portion of the historical road profile, update a portion of the historical road profile, or remove the current road profile. The server 160 can perform the features and functionalities of one or more components of the system 300. Similarly, the components of the system 300 can perform features and functionalities similar to one or more components of the server 160.

Figure 4:
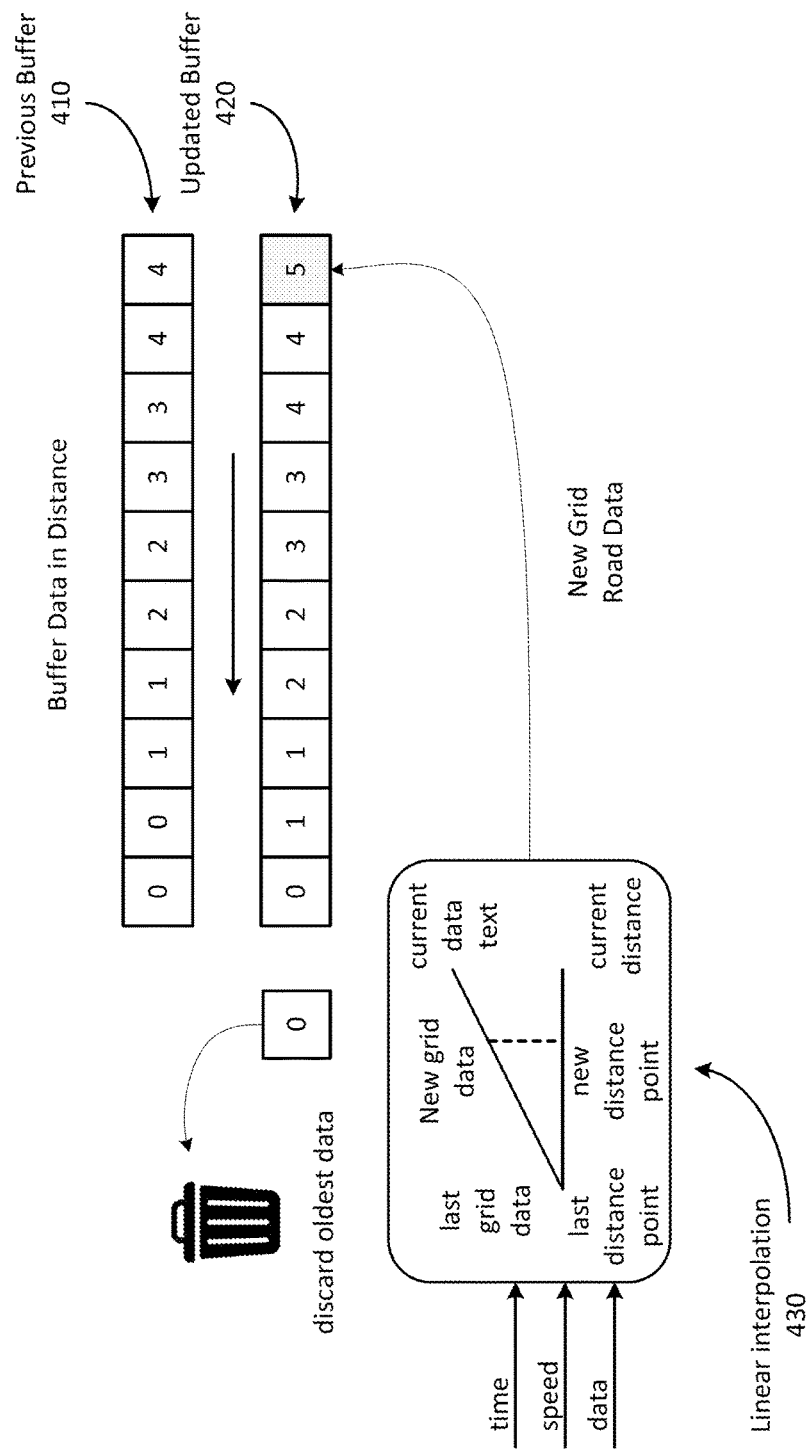
FIG. 4 is an example illustration of an interpolation process using data buffer, in accordance with an implementation.

Referring to FIG. 4, an example illustration 400 of an interpolation process using data buffer is shown, in accordance with an implementation. The interpolation can be utilized by one or more systems, components, or functions depicted in FIG. 1 and FIG. 3 to convert data from temporal-domain to spatial-domain. The illustration 400 can include a previous buffer 410, an updated buffer 420, and a linear interpolation process 430 for this example data interpolation. For example, the domain transformer 124 can perform data interpolation to convert sensor data 148 and road profile from temporal-domain to spatial-domain. The signal received via the sensors 108 or constructed by the road profile generator 128 can be in temporal-domain or time-domain. To compare the similarities between the live data and the map data, the sensor data and the road profile can be converted into a spatial domain to remove the effect of variations in vehicle velocity.

For conversion, a live buffer 330 can be used as in the illustration 400. The DPS 102 can take the instantaneous timestamp, vehicle longitudinal speed, and fingerprint having N-dimensional as input into a buffer. Responsive to performing data interpolation, the buffer can output an array of fingerprints in distance. The array of the buffer can be size N-by-L, where N is the same dimension as the input, and L is the number of distance points. The number of distance points can be used to reconstruct the data from temporal-domain to spatial-domain. For example, to reconstruct the last 60 m fingerprint in 2-D, and the live buffer 330 can sample the longitudinal distance at every 20 cm. The output of the live buffer can therefore consist of a size 2-by-300 array.

Referring to illustration 400 in further detail, an example of a buffer with 10 distance points spaced at every 20 cm is presented. To simplify the example, the fingerprint (e.g., road profile) can be one dimensional in this example.

The interpolation process can include, for example:
1) Given the previous distance point with 20 cm sample rate, the traveled distance ("d") by the vehicle 101 can be accumulated in meters relative to the distance point using vehicle longitudinal velocity and timestamp corresponding to the velocity data. The previous buffer 410 can represent the accumulated buffer data in distance.
2) If d is smaller than the discretization step (e.g., 20 cm in this case), the live buffer can continue to integrate the traveled distance.
3) If d is equal or larger than the discretization step (e.g., 20 cm in this case), the live buffer 330 or the domain transformer 124 can perform linear interpolation 430 to compute the new data. The following formula represents the linear interpolation 430:

[new grid data]=([current data]−[last grid data])*0.2/
d+[last grid data]

The domain transformer 124 can determine the new grid data responsive to the traveled distance equal to or greater than the discretization step. In this case, the discretization step includes a predetermined value of 20 cm. The domain transformer 124 can include the new grid data in the updated buffer 420. Responsive to including the new data, the oldest data from the updated buffer 420 can be discarded. Accordingly, the updated buffer 420 can represent the data converted from temporal-domain to spatial-domain.

Figure 5:
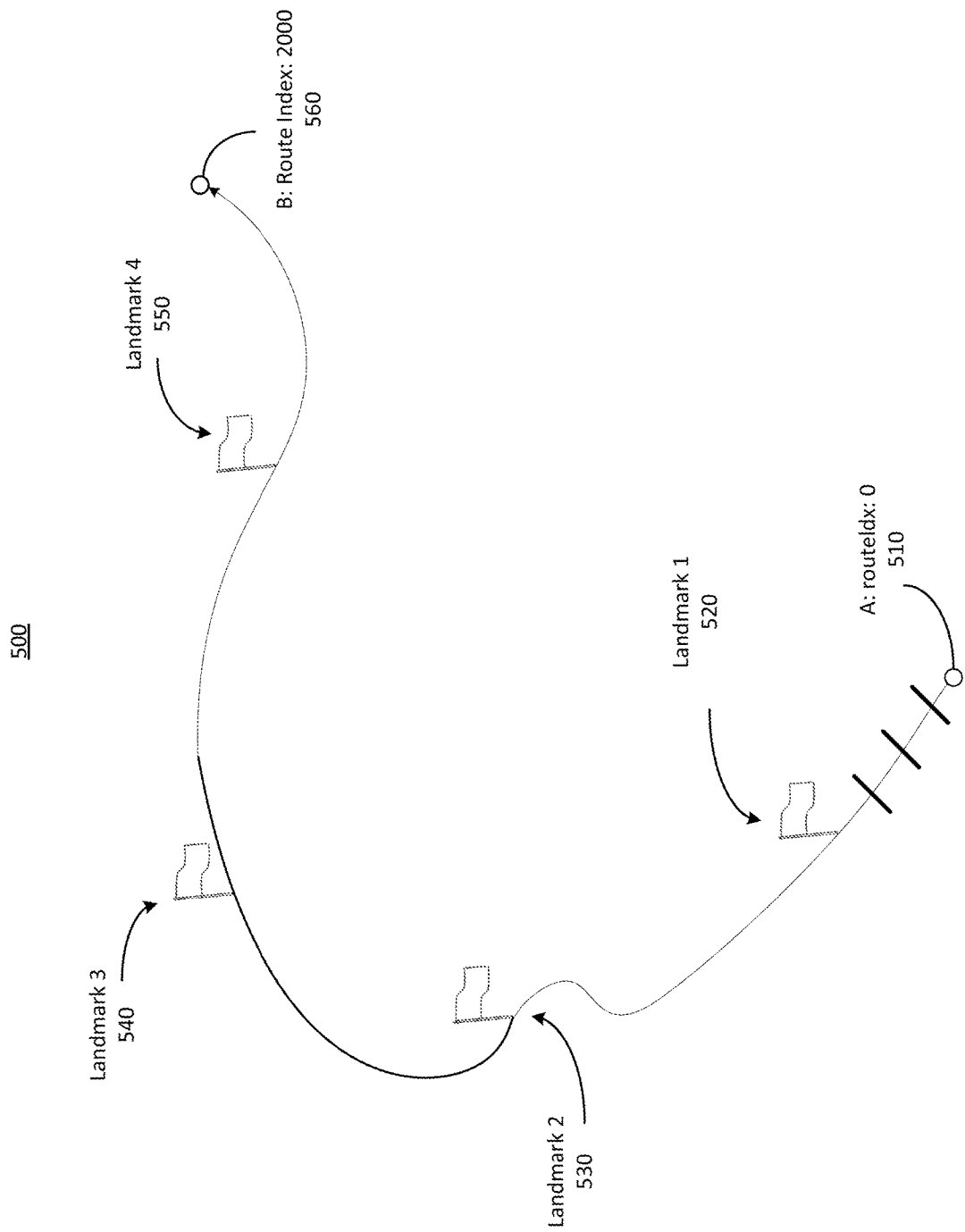
FIG. 5 is an example illustration of a route including multiple landmarks, in accordance with an implementation.

Referring to FIG. 5, an example illustration 500 of a route including multiple landmarks is shown, in accordance with an implementation. The map manager 132 or the map manager 350 can determine the route of the vehicle 101. The map manager 132 can determine the route based on an initial location of the vehicle 101 received from a positioning sensor. The route can refer to a predicted path of the vehicle 101 to travel from an initial location to a destination location. The map manager 132 may retrieve map data relative to the initial location or a first location of the vehicle 101. In some implementations, the map manager 132 can receive at least one motion data of the vehicle 101, including a longitudinal velocity data, direction data, or a navigation data of the vehicle 101. Subsequently, the map manager 132 can retrieve the map data including the one or more landmarks corresponding to the route of the vehicle 101.

Referring to illustration 500, as an example, the map manager 132 can retrieve a map data (e.g., terrain data) of a route. The map data can include a route from point A to point B, for example, including the landmarks 520, 530, 540, and 550. The point A can refer to an initial location of the vehicle 101 and the point B can refer to the destination location of the vehicle 101. The point A and the point B can be landmarks. The landmarks can be referred to as an N-by-L array of map data, e.g., 60 m long road height profile sampled at every 20 cm for both the left and the right tracks of the vehicle 101. In this example, N can be 2 and L can be 300.

The map manager 132 can use a route optimization algorithm to determine a path or a route from point A 510 to point B 560. The map manager 132 can load the map data from the server 160 (e.g., cloud) responsive to determining the route. In this case, the map data can include a route consisting of sequences of points spaced at a predetermined distance, such as 10 cm, 20 cm, etc. The route can be indexed from 0 to 2000, for example. The route can be discretized to, for example, every 20 cm a point. Thus, each landmark of the map 156 can include a relative route index as well as a lane ID. The index can be a measurement in meter or in centimeter. The lane ID can indicate the lane situated by the vehicle 101. The land ID can indicate a lateral deviation of the vehicle 101 from the center of a respective lane. In this example, the route can include a first landmark 520, a second landmark 530, a third landmark 540, and a fourth landmark 550. Each landmark can include a route index indicating a distance from point A 510. The route index can indicate a position of the map 156. Therefore, the DPS 102 can determine the location of the vehicle 101 responsive to matching the current road profile with the historical road profile associated with a landmark having the route index. The route index can be compared with the map data retrieved from the server 160 to identify a second position of the vehicle 101 as the current location.

Further from the above example, the route index and the lane ID can be used to determine the location of the landmark. The DPS 102 can determine whether the vehicle 101 is approaching, at, or passed a landmark based on the route index and the lane ID. Once a landmark match is determined by the terrain comparator 136, the route index and the lane ID corresponding to the landmark can be linked or reported to the map manager 132 to report the current location of the vehicle 101. For example, the DPS 102 can determine a match between the current road profile and a portion of the historical road profile associated with the first landmark 520 having a route index of 100. The DPS 102 can transmit the route index to the map manager 132 to report the location of the vehicle 101 at the location corresponding to the landmark. In further example, the vehicle 101 may pass the second landmark 530 without detecting a match. In this case, the DPS 102 may report a non-match to the map manager 132. Responsive to the current road profile not matching the historical road profile of the second landmark 530, the map manager 132 can determine to add the current road profile as a new portion for the historical road profile. In some cases, the map manager 132 can determine to remove the current road profile data or update the existing portion of the historical road profile data. Further details regarding the mapping of road profile data can be seen in at least FIG. 1 and FIG. 7, for example. The current location can indicate the lane position and the lateral deviation of the vehicle 101.

In some implementations, the map manager 132 may retrieve additional map data continuously as the vehicle 101 traverses the road. The map manager 132 may retrieve additional map data responsive to arriving at a landmark. In some implementations, the map manager 132 can retrieve all map data from the server 160 responsive to receiving a first location of the vehicle 101.

Figure 6:
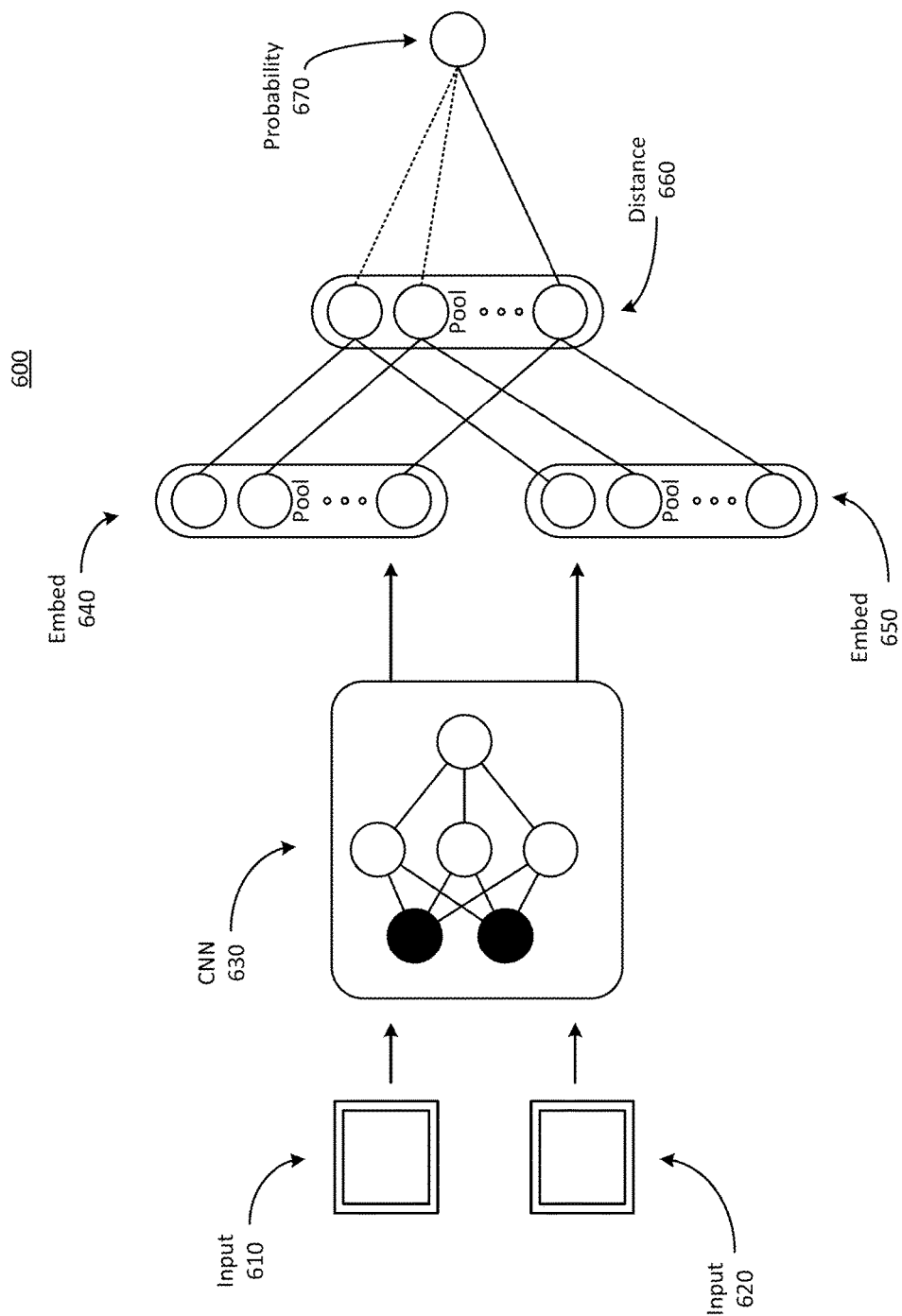
FIG. 6 is an example neural network used by a machine learning engine to determine a probability of matching inputs, in accordance with an implementation.

Referring to FIG. 6, an example neural network 600 used by a machine learning engine to determine a probability of matching inputs is shown, in accordance with an implementation. The neural network 600 can be utilized or operated by one or more systems, components, or functions depicted in FIG. 1 and FIG. 3 to determine a match between a current road profile and a historical road profile. For example, the operation can be performed by one or more components depicted in system 100 and system 300. The terrain comparator 136 can utilize one or more features of the neural network 600 to determine a match between road profiles. The neural network 600 can include any type of neural network, such as Siamese neural network, Feedforward neural network, Radial basis function neural network, or Module neural network. The neural network 600, for example, can include input 610, input 620, a Convolutional Neural Network ("CNN") layer 630, embed layers 640 and 650, a distance 660, and a probability 670.

Input 610 and input 620 can be included in an input layer of the neural network 600. For input 610 and input 620, the DPS 102 can provide a first image data of a current road profile as the input 610, and a second image data of the historical road profile as input 620. In some cases, the input can be sensor data 148, map data from the map 156, and road profiles not converted to images. The input 610 and input 620 can be transmitted or fed to the CNN 630. The CNN 630 may be referred to as a convolution layer of the neural network 600 or a hidden layer. The CNN 630 may be replaced with one or more other encoders to train or configure the input data. The input 610 and input 620 can be trained or configured by the CNN 630. In some implementations, the CNN 630 can be multi-layered, for example, including one or more max-pooling layers and one or more convolution layers to generate embed 640 and embed 650.

The CNN 630 can extract features of the input 610 and the input 620. The CNN 630 can output the features of the inputs as embed 640 and embed 650. The neural network 600 can include multiple hidden layers, such as one or more intermediary layers (not shown).

The hidden layers can be convolution layers, pooling layers, fully connected layers, or weighted layers. Each layer can include nodes that can perform a process or operation on the data. In some cases, the node can represent the process or the operation. Each node or layer can transform an input data to generate an output data (e.g., an intermediate output that can be passed to a subsequent layer, or a final output passed to another component in the system).

For example, the input 610 can receive the current road profile, process the data associated with the road profile to transform the data into an intermediate output. The CNN 630 can forward the first intermediate output to a first hidden layer. The first hidden layer can receive the first intermediate output, process the first intermediate output to transform the first intermediate output to a second intermediate output and forward the second intermediate output to a second hidden layer. The steps of processing the input 610 at each layer can be repeated to all the hidden layers in the CNN 630. Once the CNN 630 passed input 610 through the hidden layers, the CNN 630 can provide an embed 640 output at a first output layer. The steps for processing the input 610 to provide the embed 640 output can be similar for processing the input 620. Therefore the neural network 600 can provide an output layer consisting of embed 640 and embed 650 for input 610 and input 620, respectively. The features included in embed 640 and embed 650 can be compared to determine the distance 660. The distance 660 can include an indication of variation between the input 610 and the input 620. The neural network 600 can determine a final output based on the distance 660 indicating the variation. The final output can include a probability 670 that the two inputs are a match. The probability 670 may be a similarity score. For example, the neural network 600 can compare the features of embed 640 and embed 650. Once compared, the neural network 600 can determine the variation between the two embed layers. Accordingly, the variation can be used to determine a similarity score between the compared road profiles based on the final output. The neural network 600 can compare the similarity score with a predetermined threshold, such as 85%, 90%, or 95% of similarity. The output prediction can be used for determining a match between the current road profile and the historical road profile used for vehicle localization. Thus, the neural network 600 can be configured, trained, tuned, or operational to receive road profile information and output predictions using a CNN 630 having one or more hidden layers. The match between one or more road profiles can be determined by other machine learning techniques and models or using different equations.

Referring generally to FIGS. 7A-B, example illustrations of landmarks mapping are shown, in accordance with an implementation. One or more systems, components, or functions depicted in FIG. 1 and FIG. 3 can be utilized or operated for mapping one or more landmarks. As an example, a map 156 can four landmarks, such as landmark 714, landmark 718, landmark 722, and landmark 726. These landmarks can be referred to as, for example, a first landmark, a second landmark, a third landmark, and a fourth landmark, respectively. Each landmark can be associated with a historical road profile or a portion of the historical road profile. The historical road profile including historical vertical displacement data of one or more vehicles.

Referring to FIG. 7A, an example illustration 710 of a sequence of landmarks is presented. Each landmark can be reconstructed as follows:

1) At least one vehicle 101 can traverse on the road equipped with at least an IMU 104 and one or more sensors 108. The vehicle 101 can collect sensor data to generate a road profile of the ground including vehicle vertical displacement data. The DPS 102 can store the road profile in the road profile storage 152. The DPS 102 can correspond to the road profile to the map 156 or the remote map 176.

2) The DPS 102 can convert the road profile (i.e., fingerprint) from temporal-domain to spatial-domain.

3) The DPS 102 can evenly sample the road profile and cut them to generate a set of landmarks. The landmarks can be separated by a predetermined distance. Each landmark can be associated with a GPS/GNSS coordinate (e.g., latitude, longitude), a relative index of the road stretch, and a lane index. The relative index can refer to an identifier of the landmark corresponding to a location on the map 156. In some implementations, the relative index can refer to the distance of the landmark with respect to an initial location of the vehicle 101.

In view of the above steps, the first landmark through the fourth landmark can be generated. The connection between each landmark can indicate a reported or a recorded sequence the vehicle 101 passes each landmark. The sequence of landmarks in illustration 710 can be included in an initial map 156. The initial map 156 can refer to a map 156 initiated by road profile from a single vehicle 101.

Referring to FIG. 7B, an example illustration 730 of an added or updated sequence of landmarks is presented. The illustration 730 can include the first landmark through the fourth landmark from the map 156, as in FIG. 7A. Each landmark can be presented as a node, where the connection between each node can refer to an edge. In one example, one or more data point can be added to the sequence of landmarks as follows:

1) Step 1. Traverse one or more vehicles on the road at the locations of the landmarks. The one or more vehicles can be equipped with the same set of equipment. The one or more vehicles can include the same platform as the vehicle 101. In some implementations, the DPS 102 of each vehicle 101 can factor in the suspension dynamic the vehicle 101 to remove the suspension effect for generating the road profile.
2) Step 2. The DPS 102 of each vehicle 101 can utilize the terrain-based localization technique while traversing on the road. The vehicle 101 may detect one or more landmarks based on a match between a current road profile and a historical road profile. In some cases, the vehicle 101 may not detect one or more landmarks. Landmarks detected in succession can be linked with an edge.

For example, the vehicle 101 can detect a consecutive match between two landmarks, such as the first landmark and the third landmark. In response to the consecutive match, the DPS 102 can add an edge between the first landmark and the third landmark. In this case, the second landmark was not detected by the vehicle 101. The vehicle 101 may detect the fourth landmark. The DPS 102 can add an edge between the third landmark and the fourth landmark of the map 156.

The DPS 102 can update the map 156 with landmarks as follows:

1) Determine the number of edges connected to a node. For example, after 100 runs, a node may include 10 edges (i.e., 10% similarity). The DPS 102 can remove the node with a low number of edges. In some cases, the map 156 can include two nodes relative to the same location. In this example, one or more vehicles may detect each node 50% of the time. Accordingly, the DPS 102 may not remove any node. In some cases, the DPS 102 can transmit a report to the server 160 via the network 103 or an operator via the display device 112.
2) The DPS 102 can perform transitive reduction or filtering techniques to the graph to simplify edges.
3) The DPS 102 can merge edges of one or more nodes or landmarks. The one or more landmarks may be similar in distance, profile, etc. The merge can be by averaging the data of each landmark.
4) The DPS 102 can determine to a new node or landmark if at least one landmark is removed. The DPS 102 can determine that an edge is too long between two consecutive landmarks. For example, the DPS 102 can remove the second landmark based on an insufficient number of edges. The DPS 102 can determine to add a fifth landmark having a historical vehicle vertical displacement data at a location between the first landmark and the third landmark. The DPS 102 can add the fifth landmark responsive to removing the second landmark and based on the edge exceeding a length threshold, such as 200 m, 300 m, or other predetermined distance deemed to be too lengthy.

As the process above repeats, the DPS 102 can add more edges and provide more updates to the map 156, thereby increasing the accuracy of the road profile data and location data corresponding to each landmark. Therefore, a ready to use graph or map 156 can include many landmarks with each landmark connected to others via multiple edges. The above example describes a process to map each landmark node and is not limited by the above example method. Accordingly, other mapping techniques can be used to correlate one or more landmarks to locations on the map 156.

Figure 8:
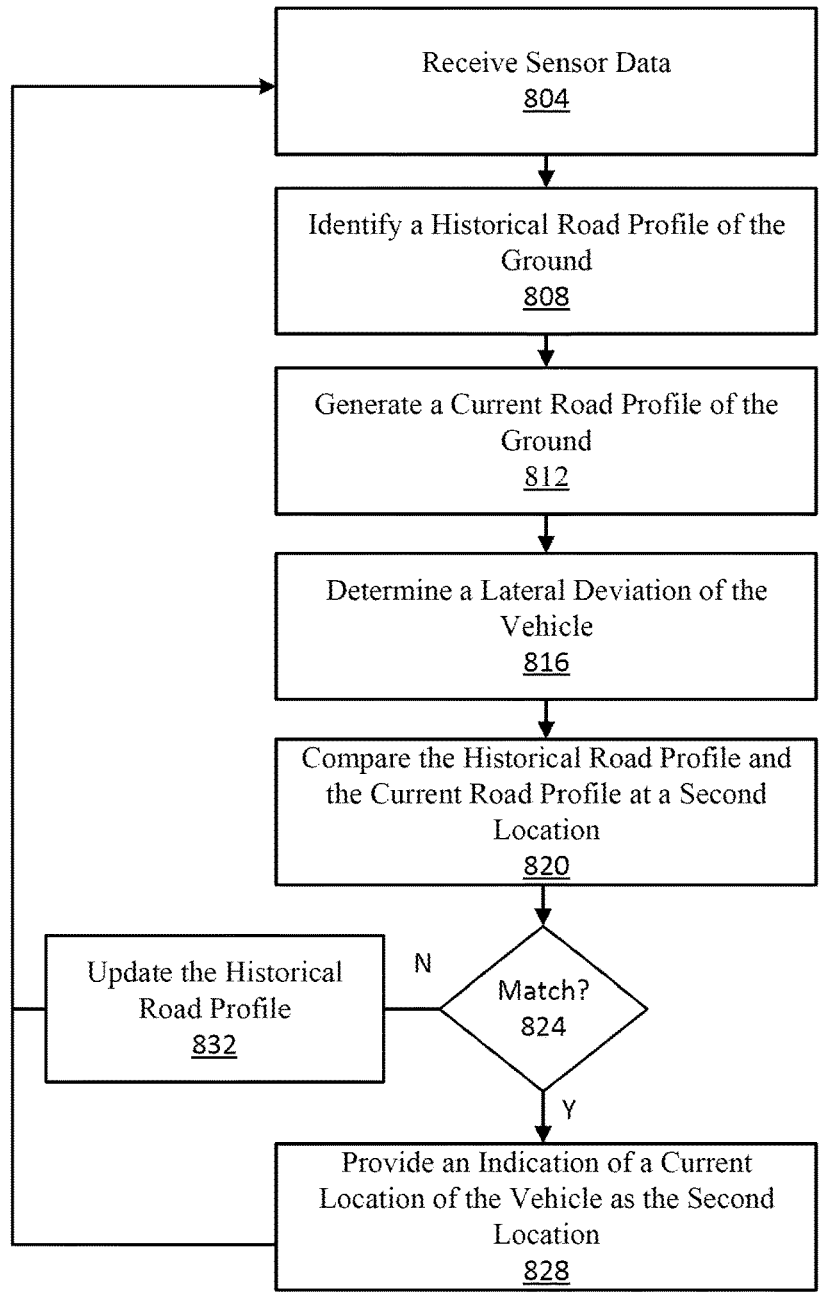
FIG. 8 is a flow diagram of an example method for vehicle localization, in accordance with an implementation.

Referring to FIG. 8, a flow diagram of an example method for vehicle localization is shown, in accordance with an implementation. The method 800 can be performed or operated using one or more components depicted, for example, at least in FIG. 1 and FIG. 3. In brief overview, at step 804, the DPS can receive sensor data from one or more sensors. At step 808, the DPS can identify a historical road profile of the ground. At step 812, the DPS can generate a current road profile of the ground. At step 816, the DPS can determine a lateral deviation of the vehicle. At step 820, the DPS can compare the historical road profile and the current road profile at a second location. At step 824, the DPS can determine whether a match occurred between the historical road profile and the current road profile. At step 828, the DPS can provide an indication of a current location of the vehicle as the second location in response to the match. At step 832, the DPS can update the historical road profile in response to the road profiles not matching.

Referring to FIG. 8 in further detail, at step 804, the DPS can receive, via one or more sensors on the vehicle, sensor data comprising a plurality of vertical displacement signals indicating vertical displacement between a body of the vehicle and a ground on which the vehicle traverses. The sensors can include an IMU, at least one range sensor, a positioning sensor, and at least one imaging sensor. The DPS can receive sensor data corresponding to each of the sensors. The sensors can be mounted on or embedded in the vehicle. The location of the sensors can be seen, for example, at FIGS. 2A-2F. The DPS can receive, via the IMU on a vehicle that measures at a frequency of at least 100 Hz, vertical acceleration data, angular velocity data, and lateral acceleration data. The DPS can receive corresponding velocity data corresponding to the acceleration data from the IMU. In some cases, the DPS can convert acceleration data to velocity data, and vice versa.

The DPS of the vehicle can receive vertical displacement data of the vehicle from one or more range sensors. The vertical displacement data indicating the height of the vehicle. The DPS can factor in the suspension system and configuration of the vehicle. The range sensors and other sensors herein can be measured at a similar frequency as the IMU, such as 100 Hz. The one or more sensors may be measured at different frequencies than the IMU, such as 75 Hz, 50 Hz, 25 Hz, etc. The range sensors can be mounted at a lateral axis of the vehicle with the IMU. The DPS can determine a vehicle vertical body height based on fusing at least the vertical acceleration data and the altitude data. The DPS can fuse data by using a model (e.g., a state-space model) and a filtering technique (e.g., Kalman filter). The DPS can filter out any bias data using the filtering technique. The DPS can receive, via one or more sensors, vehicle longitudinal velocity data and angular velocity data (e.g., roll angular velocity and pitch angular velocity).

The DPS can receive, via a positioning sensor on the vehicle, location data of the vehicle, and altitude data of the vehicle. The DPS can determine a first location or an initial location of the vehicle via the positioning sensor. The DPS can retrieve map data from a data repository or a server based on the initial location of the vehicle. The positioning sensor can receive one or more signals from one or more satellites to determine the location of the vehicle. The position sensor can provide a general location of the vehicle. The format of the location data can include a longitudinal value and a lateral value corresponding to the map.

The DPS can use the sensor data to determine one or more road heights at the location of the vehicle. The road height can be based on a first height measured at the first side of the vehicle and a second height measured at a second side of the vehicle. The first side can refer to the left side in the lateral axis and the second side can refer to the right side in the lateral axis. The DPS can generate a road profile using the sensor data, such as vertical displacement data of the vehicle. In some implementations, the DPS can generate the road profile using the road heights. By using the road height, the DPS can generate the road profile without the effect of different suspension configurations. The road profile can include lateral displacement data indicating a displacement of the vehicle from the center of the lane. The road profile can include a lane identifier ("ID") identifying the lane occupied by the vehicle. In some cases, the road profile can include a route index associated with a landmark. The DPS can use the route index to determine a current location of the vehicle.

In some implementations, the DPS can determine the suspension dynamic data of the vehicle based on one or more acceleration sensors of the one or more sensors. The DPS can utilize the suspension dynamic data to normalize the vertical displacement data or signals in the road profile. By way of normalization, the road profile can be utilized by the server for one or more vehicles with different suspension dynamics or configurations.

At step 808, the DPS can identify a historical road profile of the ground for a first location of the vehicle. The historical road profile can be indicative of vertical displacements (e.g., historical vertical displacements) between the body of the vehicle and the ground at one or more locations of the map including the first location. The DPS can determine the first location of the vehicle using a positioning sensor. The first location may be referred to as an initial location at the start of a route. The first location can be determined responsive to activating the positioning sensor, such as during the ignition of the vehicle engine. The DPS can retrieve map data including data from a portion of the map. The map may be stored in the data repository of the DPS. The historical data can include or be associated with one or more landmarks on the map. For example, the DPS can retrieve the map from the data repository. The DPS can determine a first landmark subsequent to the first location of the vehicle. The first landmark can indicate a second location on the map, different than the first location of the vehicle.

The DPS can retrieve the map data from a server via a network. The map from the server can be centralized for one or more vehicles with different suspension configurations. For example, the server can include a world-wide map including all the map route. The server can receive road profiles from one or more vehicles including road height data (e.g., after filtering the effect of different suspension systems). Once received, the server can store the road profile as a historical road profile. In some cases, the server can generate a historical road profile based on sensor data received from the one or more vehicles. The data within the historical road profile can be in spatial-domain. The server can associate the historical road profile with one or more landmarks on the map. The server can add, remove, or update the landmark based on the road profiles received from one or more vehicles.

To determine a portion of the map to retrieve, the DPS can determine a trajectory of the vehicle based on location data of the vehicle received from the one or more sensors. For example, the location data can indicate the first location of the vehicle. The DPS can determine, based on the first location of the vehicle and the trajectory of the vehicle, that the vehicle is approaching one or more landmarks corresponding to respective one or more locations on the map. The DPS can retrieve, via a map manager, the historical road profile of the ground comprising the one or more landmarks. The historical road profile and the one or more landmarks can be generated by one or more vehicles using the sensor data.

At step 812, the DPS can generate a current road profile of the ground based on the sensor data including vertical displacement signals of the vehicle. The DPS can use a road profile generator (e.g., fingerprint generator) to generate the road profile. The DPS can continuously generate the current road profile of the ground to compare with the historical road profile at one or more landmarks. The DPS can receive suspension dynamic data from one or more sensors, such as the range sensor position adjacent to the suspension system of the vehicle. The DPS can receive filter the suspension dynamic data from the road profile. By filtering out the suspension dynamic data, the road profile can be compared to the historical road profile of one or more vehicles with different suspension dynamics or configurations. The DPS can generate the road profile similar to the process in at least FIG. 1 and FIG. 3.

The DPS can transmit the road profile to a domain transformer (e.g., live buffer). The domain transformer can convert data in the temporal-domain (e.g., time-domain) to data in the spatial-domain (distance-domain). The DPS can convert the road profile from the temporal-domain to the spatial-domain to remove the effect of the vehicle speed from the data. The road profile in the spatial-domain can be compared with the historical road profile. The historical road profile can include one or more road profiles generated by the one or more vehicles. The DPS can transmit the road profile to the server. The historical road profile can be in spatial-domain. In some implementations, the server can determine whether the road profile received from one or more vehicles is in spatial-domain. For example, if the road profile is in the temporal-domain, the server may either discard the road profile to not merge with an existing historical road profile. In another example, the server may perform one or more features or functionalities of the DPS, such as to convert the road profile from the temporal-domain to the spatial-domain.

In some implementations, a live buffer (e.g., domain transformer) of the DPS can convert the current road profile from the temporal-domain to the spatial-domain using (i) the plurality of vertical displacement signals of the current road profile, (ii) a plurality of timestamps corresponding to the plurality of vertical displacement signals, and (iii) longitudinal velocity data of the vehicle received via the one or more sensors. In some implementations, the sensor data can be converted from the temporal-domain to the spatial-domain prior to generating the road profile. Responsive to converting the road profile, the live buffer can transmit the converted road profile to a terrain comparator for comparison between the current road profile and the historical road profile in spatial-domain. The terrain comparator can perform the comparison at the lateral deviation.

In some implementations, the DPS can normalize the plurality of vertical displacement signals of the current road profile based on the suspension dynamic data of the vehicle. The suspension dynamic data determined based on acceleration data from one or more sensors. The DPS can utilize the normalized road profile to compare with historical vertical displacement data of the historical road profile at the lateral deviation. In this case, the historical vertical displacement data can be normalized before the DPS retrieving the map data including the historical road profile.

In some implementations, the DPS can normalize the vertical velocity data and the angular velocity data (e.g., roll angle velocity and pitch angle velocity) associated with the longitudinal velocity data to a predetermined velocity. For example, the longitudinal velocity of the vehicle can affect the suspension dynamics. The DPS can factor in the longitudinal velocity data to normalize the vertical velocity data and the angular velocity data at a predetermined velocity. Responsive to the normalization, the DPS, via the road profile generator, can generate the current road profile of the ground based on the sensor data including the longitudinal velocity data, the vertical velocity data normalized to the predetermined velocity, the angular velocity data normalized to the predetermined velocity, and the plurality of vertical displacement signals.

In some implementations, one or more steps may be performed in parallel, or without a particular order from the others. For example, step 812 can be before step 808, step 816 can be before either step 812 or step 808, or other arrangements thereof.

At step 816, the DPS can determine, based on lateral displacement data received via the one or more sensors, a lateral deviation of the vehicle. The lateral displacement data can be indicative of, for example, a deviation of the vehicle from the center of the lane and the lane occupied by the vehicle. The lateral deviation can correspond to a lane ID on the map. The lane ID can include at least one value indicating the lane on the route. The lane ID can include an indication of the displacement from the center of the lane. For example, in a three-lane road, the lane ID can be 100, 200, and 300. The third digit of the lane ID can represent the lane on the road. For example, lane ID 100 can be associated with a first lane, lane ID 200 with a second lane, and lane ID 300 with a third lane. In further example, the first two digits of the lane ID can represent an exact lateral location of a respective lane. For example, the center of the first lane can be represented as lane ID 150. Thus, the edge of the first lane can be represented by either lane ID 101 or 199, for example. In some cases, each landmark can include multiple lane ID associated with the historical road profile to indicate historical vertical displacement data of the first side and the second side of the vehicle. In this case, the DPS can compare the current road profile with the historical road profile at a first lane ID, a second land ID, and a route index (e.g., location index).

At step 820, the DPS can compare the historical road profile to the current road profile at a second location. The DPS can compare the road profiles at a lateral deviation (e.g., from the center of a lane or at a lane). The DPS can use at least a machine learning technique, a model, a matrix, or an equation to determine a probability that the road profiles matched or not matched. The probability can be referred to as a similarity score. The DPS can utilize at least one aforementioned technique to determine a false positive or a false negative in the comparison between the road profiles. The two road profiles can be configured to spatial-domain by the DPS for comparison. In some implementations, the server can configure the historical road profile from the temporal-domain to the spatial-domain. In some implementations, the two road profiles can be normalized based on the suspension dynamic data for the comparison. The DPS can compare the road profile generated by the vehicle with the historical road profile generated by one or more vehicles with different suspension dynamics.

At step 824, the DPS can determine whether the current road profile matches the historical road profile. The DPS can determine the match responsive to a similarity score exceeding a score threshold. The score threshold can be predetermined, for example, at 85%, 90%, or 95%. The score threshold can be represented as, for example, a percentage, a value, or a ratio. The DPS can determine that the road profiles do not match responsive to the similarity score not satisfying the score threshold.

In some implementations, the DPS can determine a match between the historical road profile and the current road profile. The match between the two road profiles can be at a second location subsequent to the first location. The two road profiles can be at the lateral deviation. The DPS can select the historical road profile from the map at the same lateral deviation as the generated road profile. The DPS can retrieve or load the map from the server. The DPS can store and update the map in the data repository local to the vehicle by consulting the server. The DPS can retrieve a portion of the map from the server having an area around the first location of the vehicle. The area can include a predetermined radius from the first location, such as 5 miles, 10 miles, or 20 miles.

At step 828, the DPS can provide, responsive to the match, an indication of a current location of the vehicle as the second location stored in the historical road profile that aligns with the lateral deviation. The second location can correspond to a landmark associated with the historical road profile. In some cases, the landmark may be depicted as a portion of the historical road profile. The landmark can include a route index and a lane ID indicating the location of the landmark on the map. In response to the DPS matching the current road profile to the historical road profile, the DPS can transmit the route index and the lane ID to a map manager. The map manager can an indication of the current location of the vehicle as the second location having a route index and the lane ID. Therefore, the DPS can localize the vehicle based on the terrain information (e.g., the road profile comparison). In some cases, the route index can indicate a distance from the first location of the vehicle. The distance can be in centimeters, meters, or other metrics.

In some implementations, one or more landmarks on the map can be represented as a node in a graph. The node can be connected via one or more edges. In response to a match between the road profiles at a first landmark associated with the second location, the DPS can add an edge from the first location to the first landmark. In this case, the first location may be a landmark. In some implementations, the DPS can provide an indication of the current location of the vehicle as the second location in an offline state. The offline state can refer to a state where the DPS is not able to receive one or more satellite signals. In this case, the DPS can operate without a network connection for vehicle localization. The DPS can provide the indication of the current location of the vehicle to an interface of the vehicle, such as a display device.

At step 832, the DPS can update the historical road profile. The DPS can determine to update the historical road profile based on the current road profile not matching the historical road profile. Updating the historical road profile can refer to updating the map data of the map. The map can be the map stored in the data repository of the vehicle or the remote map stored on the server. The remote map can be accessible to one or more vehicles, having either similar to or different from the vehicle generating the current road profile. The remote map can include one or more landmarks associated with the historical road profile. For example, the first location of the vehicle can be a landmark. The vehicle can traverse to the first landmark subsequent to the first location. The first landmark indicative of the second location. Responsive to determining that the current road profile does not match the historical road profile at the first landmark, the DPS may not add an edge to the first landmark from the first location. The DPS may not report the location of the vehicle at the second landmark responsive to the non-matched road profiles. In further example, the vehicle can traverse to the second landmark associated with a third location. In response to a match between a second current road profile and the historical data at the second landmark, the DPS can add an edge from the first location to the second landmark.

In some implementations, the DPS can determine that the vehicle is approaching a second landmark based on the vehicle passing the first landmark and the aggregated distance traveled by the vehicle. For example, the DPS can determine, using longitudinal velocity data received from the one or more sensors of the vehicle, a travel distance of the vehicle from the current location. Each landmark may be separated by a predetermined distance, such as 200 m. The travel distance can indicate that vehicle approaching the second landmark at the predetermined distance from the first landmark. For example, the DPS can determine that the travel distance is 100 m from the first landmark. Therefore, the DPS can determine that the vehicle will arrive at a second landmark in 100 m. The second landmark can include a vertical displacement data different from the first landmark. The second landmark may include vertical displacement data similar to the first landmark. The DPS can provide the historical vertical displacements of the historical road profile at the second landmark to a controller of the vehicle to cause the controller to control a component of the vehicle based on the historical vertical displacements of the historical road profile at the second landmark. For example, the DPS can control the suspension system, the steering system, or the braking system based on the historical road profile at the second landmark. The DPS can determine at least one of the vehicle systems prior to arriving at the second landmark, for example.

In some implementations, responsive to a predetermined number of drives, the DPS can determine that the number of edges of a landmark does not meet a threshold ratio or percentage. The DPS can determine to remove the landmark from the map data in this case. For example, after one or more vehicles traverses a road at the second landmark for 100 times, the DPS can determine that the second landmark includes 20 edges. In this example, the historical road profile corresponding to the second landmark matches the current road profile at a 2-to-10 rate, 20%, or at 0.20 score. If a threshold to maintain or update a landmark is 80% or higher, such as 85%, 90%, or 95%, the DPS can determine to remove the landmark from the map.

The DPS can add a new landmark at the location corresponding to the removed landmark, such that the edge between a prior landmark to a subsequent landmark does not exceed a distance threshold. The distance threshold can be predetermined, for example, at 50 meters, 100 meters, or 200 meters depending on the location on the map. For example, if the location is on a highway, the DPS may set a distance threshold at 200 meters between each landmark. On the other hand, if the location is in a residential area, the DPS can set the distance threshold at 50 meters, for example. Therefore, the DPS can update the map accordingly depending on whether the current road profile matches the historical road profile. The process of adding, removing, or updating the landmark can be illustrated and describe in FIGS. 7A-B, for example. Therefore, the DPS can perform vehicle localization with terrain data. The DPS may incorporate the terrain-based localization technique with one or more additional localization techniques. The terrain-based localization technique may be "sensor data" to other localization techniques.

Each landmark of the plurality of landmarks can be at a predetermined distance from each other. The DPS may travel pass the first landmark by the predetermined distance. However, the DPS may not detect a second landmark at a predetermined distance from the first landmark. In this case, the DPS may generate the road profile, and update the map with the generated road profile as a second landmark. The road profile can be converted into a part of the historical road profile. For example, the DPS can generate, responsive to the vehicle at the predetermined distance from the current location (e.g., the second location associated with a first landmark), a second landmark associated with a second plurality of vertical displacement signals received from the one or more sensors. The second landmark is located at the predetermined distance from the current location of the vehicle. The DPS can update, using the second plurality of vertical displacement signals at the second landmark, the one or more landmarks of the map with the second landmark. The DPS can update the historical vertical displacements of the historical road profile at the second landmark.

The above steps can be related to or seen in one or more systems above, such as system 100 and system 300. Subsequent to matching the road profiles for vehicle localization, the DPS and the server can reiterate the process, such as transitioning back to step 804 of method 800.

Figure 9:
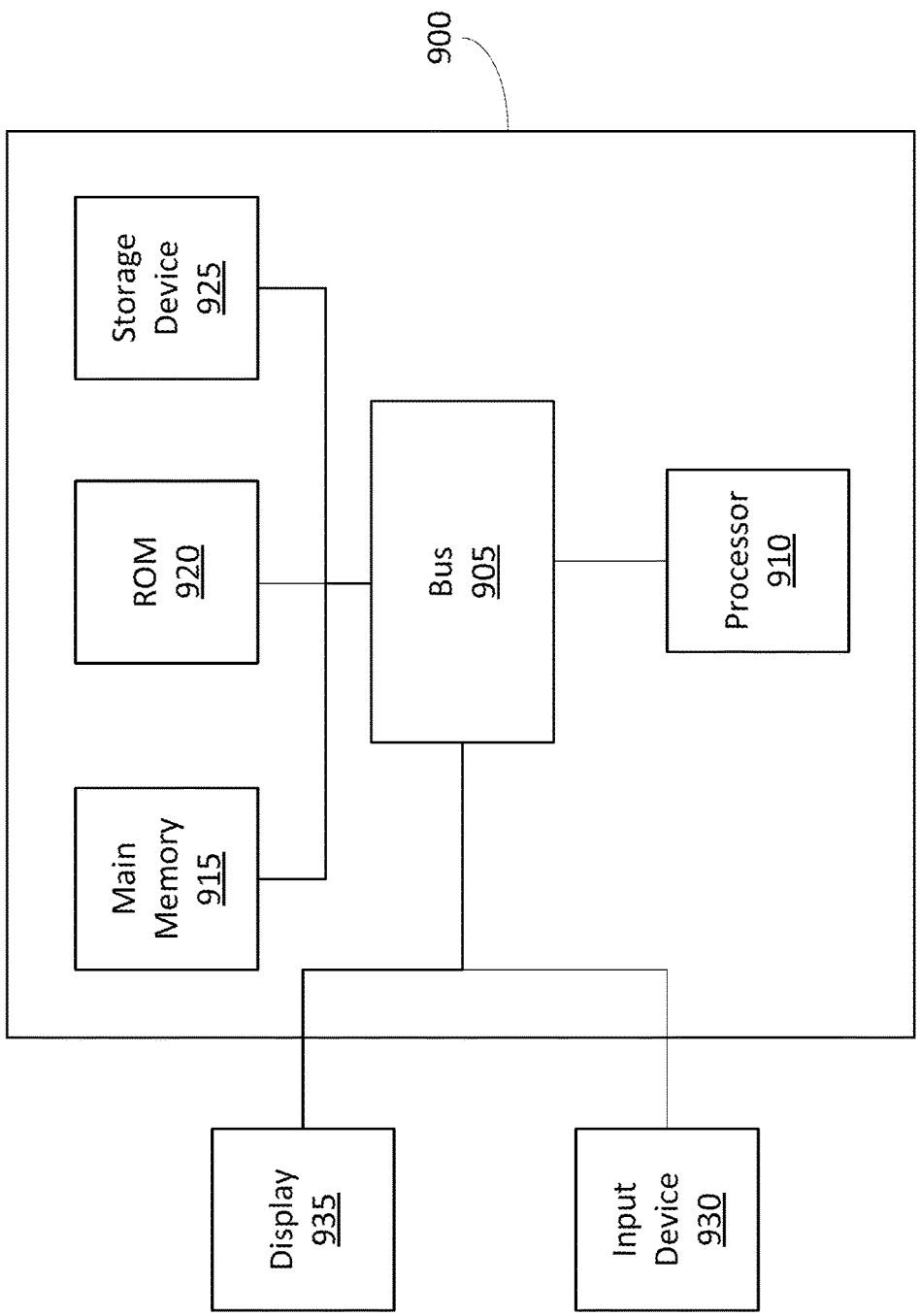
FIG. 9 is a block diagram illustrating an architecture for a computer system that can be employed to implement elements of the systems, methods, and apparatus described and illustrated herein, including, for example, the systems and apparatus depicted in FIGS. 1-3, and the methods depicted in FIGS. 4-8.

FIG. 9 is a block diagram of an example computer system 900. The computer system or computing device 900 can include or be used to implement one or more components of system 100, system 300, or perform one or more aspects of the method 800. For example, the system 900 can implement one or more components or functionality of the system 100, the DPS 102, the vehicle, or the server 160. The computing system 900 includes at least one bus 905 or other communication components for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage devices, coupled to the bus 905 for storing information, and instructions to be executed by the processor 910. The main memory 915. The main memory 915 can also be used for storing one or more of a propeller control program, tank map, collected data, tank inspection process, quality metric, diagnostic program, or other information. The computing system 900 may include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions. The storage device 925 can include or be part of the data repository 144 or the remote data repository 168.

The computing system 900 may be coupled via the bus 905 to a display 935, such as a liquid crystal display, or active matrix display, for displaying information to an operator of the vehicle 101. An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935. The display 935 (e.g., on a vehicle dashboard) can, for example, be part of the DPS 102, vehicle 101, or other component depicted herein. The display may correspond to the display device 112 of the vehicle 101.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components, such as components of the DPS 102, which illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system for vehicle localization, comprising:
a data processing system comprising memory and one or more processors to:
receive, via one or more sensors on the vehicle, sensor data comprising vertical velocity data, longitudinal velocity data, and a plurality of vertical displacement signals indicating vertical displacement between a body of the vehicle and a ground on which the vehicle traverses;
identify, for a first location of the vehicle, a historical road profile of the ground indicative of vertical displacements between the body of the vehicle and the ground at a plurality of locations including the first location;
normalize the vertical velocity data associated with the longitudinal velocity data to a predetermined velocity;
generate a current road profile of the ground based on the sensor data comprising the longitudinal velocity data, the vertical velocity data normalized to the predetermined velocity, and the plurality of vertical displacement signals;
determine, based on lateral displacement data received via the one or more sensors, a lateral deviation of the vehicle;
determine a match between the historical road profile and the current road profile at a second location subsequent to the first location that aligns with the lateral deviation; and
provide, responsive to the match, an indication of a current location of the vehicle as the second location stored in the historical road profile that aligns with the lateral deviation.

2. The system of claim 1, wherein the historical road profile of the ground indicative of vertical displacements is in a spatial domain and the current road profile of the ground comprising the plurality of vertical displacement signals is in a temporal domain, and wherein the data processing system is further configured to:
convert, via a buffer on the vehicle, the current road profile from the temporal domain to the spatial domain using (i) the plurality of vertical displacement signals of the current road profile, (ii) a plurality of timestamps corresponding to the plurality of vertical displacement signals, and (iii) the longitudinal velocity data of the vehicle received via the one or more sensors; and
compare, responsive to converting the current road profile from the temporal domain to the spatial domain, the historical road profile with the current road profile in the spatial domain at the second location that aligns with the lateral deviation to determine the match.

3. The system of claim 1, wherein the one or more sensors comprise:
an inertial measurement unit ("IMU") located at a distal end, proximal end, or between the distal end and the proximal end of a longitudinal axis of the vehicle;
a plurality of range sensors located on a lateral axis of the vehicle with the IMU; and
a location sensor to provide location data,
wherein the sensor data further comprise the longitudinal velocity data, the vertical velocity data, and angular velocity data, and
wherein the data processing system is further configured to:
generate the current road profile of the ground based on the longitudinal velocity data, the vertical velocity data, and the angular velocity data; and
determine the first location of the vehicle based on the location data.

4. The system of claim 3, wherein the one or more sensors further comprise a plurality of acceleration sensors located at the top and the bottom of each suspension of the vehicle, wherein the data processing system is further configured to:
determine, via the plurality of acceleration sensors, suspension dynamic data of the vehicle;
normalize the plurality of vertical displacement signals of the current road profile based on the suspension dynamic data of the vehicle; and
compare the historical vertical displacements of the historical road profile with the normalized vertical displacement signals of the current road profile at the second location that aligns with the lateral deviation.

5. The system of claim 1, wherein the sensor data further comprise roll angular velocity data and pitch angular velocity data further utilized to generate the current road profile.

6. The system of claim 1, wherein the sensor data further comprise angular velocity data, and wherein the data processing system is further configured to:
normalize the angular velocity data associated with the longitudinal velocity data to the predetermined velocity; and
generate the current road profile of the ground based on the sensor data comprising the longitudinal velocity data, the vertical velocity data normalized to the predetermined velocity, the angular velocity data normalized to the predetermined velocity, and the plurality of vertical displacement signals.

7. The system of claim 1, wherein the data processing system is further configured to:
determine a trajectory of the vehicle based on location data of the vehicle received from the one or more sensors;
determine, based on the first location of the vehicle and the trajectory of the vehicle, the vehicle approaches a plurality of landmarks corresponding to the plurality of locations; and
retrieve, via a map manager, the historical road profile of the ground comprising the plurality of landmarks, the historical road profile and the plurality of landmarks generated by a plurality of vehicles using second sensor data.

8. The system of claim 1, wherein the historical road profile of the ground comprises a plurality of landmarks,
wherein each landmark of the plurality of landmarks comprises a location index and a lane identifier identifying a lane of the vehicle,
wherein the lateral deviation identifies a distance of the vehicle from a center of the lane and the lane occupied by the vehicle, and
wherein the data processing system is further configured to provide, responsive to determining the match between the historical road profile and the current road profile, the indication of the current location of the vehicle comprising the location index and the lane identifier to an interface of the vehicle to cause the interface to display the vehicle at the current location and the lane.

9. The system of claim 1, wherein the historical road profile of the ground comprises a plurality of landmarks, wherein a second landmark of the plurality of landmarks is located a predetermined distance from the current location of the vehicle associated with a first landmark, the second landmark associated with the historical road profile at a next location, wherein the data processing system is further configured to:
  determine, using the longitudinal velocity data received from the one or more sensors of the vehicle, a travel distance of the vehicle from the current location, the travel distance indicative of the vehicle approaching the second landmark at the predetermined distance from the first landmark; and
  provide the historical vertical displacements of the historical road profile at the second landmark to a controller of the vehicle to cause the controller to control a component of the vehicle based on the historical vertical displacements of the historical road profile at the second landmark.

10. The system of claim 1, wherein the historical road profile of the ground comprises a plurality of landmarks, wherein each landmark of the plurality of landmarks is separated by a predetermined distance, wherein the data processing system is further configured to:
  generate, responsive to the vehicle at the predetermined distance from the current location associated with a first landmark, a second landmark associated with a second plurality of vertical displacement signals received from the one or more sensors, the second landmark located at the predetermined distance subsequent to the current location; and
  update, using the second plurality of vertical displacement signals at the second landmark, the plurality of landmarks with the second landmark and the historical vertical displacements of the historical road profile at the second landmark.

11. The system of claim 1, wherein the historical road profile of the ground comprises a plurality of landmarks, wherein the second location is associated with a first landmark of the plurality of landmarks, and wherein determining the match, the data processing system is further configured to:
  compare the historical vertical displacements of the historical road profile to the plurality of vertical displacement signals of the current road profile at the first landmark that aligns with the lateral deviation;
  determine a score indicative of similarities between the historical road profile and the current road profile at the first landmark that aligns with the lateral deviation; and
  update, responsive to the score satisfying a similarity threshold, the historical vertical displacements of the historical road profile at the first landmark using the plurality of vertical displacement signals received at the first landmark; or
  remove, responsive to the score not satisfying the similarity threshold, the first landmark from the plurality of landmarks of the historical road profile.

12. The system of claim 1, wherein the data processing system is further configured to provide, to an interface of the vehicle, the indication of the current location of the vehicle as the second location in an offline state.

13. A method for vehicle localization, comprising:
  receiving, by a data processing system comprising one or more processors and memory, via one or more sensors on a vehicle, sensor data comprising vertical velocity data, longitudinal velocity data, and a plurality of vertical displacement signals indicating vertical displacement between a body of the vehicle and a ground on which the vehicle traverses;
  identifying, by the data processing system, for a first location of the vehicle, a historical road profile of the ground indicative of vertical displacements between the body of the vehicle and the ground at a plurality of locations including the first location;
  normalizing, by the data processing system, the vertical velocity data associated with the longitudinal velocity data to a predetermined velocity;
  generating, by the data processing system, a current road profile of the ground based on the sensor data comprising the longitudinal velocity data, the vertical velocity data normalized to the predetermined velocity, and the plurality of vertical displacement signals;
  determining, by the data processing system, based on lateral displacement data received via the one or more sensors, a lateral deviation of the vehicle;
  determining, by the data processing system, a match between the historical road profile and the current road profile at a second location subsequent to the first location that aligns with the lateral deviation; and
  providing, by the data processing system, responsive to the match, an indication of a current location of the vehicle as the second location stored in the historical road profile that aligns with the lateral deviation.

14. The method of claim 13, wherein the historical road profile of the ground indicative of vertical displacements is in a spatial domain and the current road profile of the ground comprising the plurality of vertical displacement signals is in a temporal domain, and wherein the method further comprises:
  converting, by the data processing system, via a buffer on the vehicle, the current road profile from the temporal domain to the spatial domain using (i) the plurality of vertical displacement signals of the current road profile, (ii) a plurality of timestamps corresponding to the plurality of vertical displacement signals, and (iii) the longitudinal velocity data of the vehicle received via the one or more sensors; and
  comparing, by the data processing system, responsive to converting the current road profile from the temporal domain to the spatial domain, the historical road profile with the current road profile in the spatial domain at the second location that aligns with the lateral deviation to determine the match.

15. The method of claim 13, wherein the one or more sensors comprise:
  an inertial measurement unit ("IMU") located at a distal end, proximal end, or between the distal end and the proximal end of a longitudinal axis of the vehicle;
  a plurality of range sensors located on a lateral axis of the vehicle with the IMU, and
  a location sensor to provide location data,
  wherein the sensor data further comprise the longitudinal velocity data, the vertical velocity data, and angular velocity data,
  wherein the method further comprises:
    generating, by the data processing system, the current road profile of the ground, based on the longitudinal velocity data, the vertical velocity data, and the angular velocity data; and
    determining, by the data processing system, the first location of the vehicle based on the location data, and
  wherein the one or more sensors further comprise a plurality of acceleration sensors located at the top and the bottom of each suspension of the vehicle, and wherein the method further comprises:

determining, by the data processing system, via the plurality of acceleration sensors, suspension dynamic data of the vehicle;

normalizing, by the data processing system the plurality of vertical displacement signals of the current road profile based on the suspension dynamic data of the vehicle; and comparing, by the data processing system, the historical vertical displacements of the historical road profile with the normalized vertical displacement signals of the current road profile at the second location that aligns with the lateral deviation.

16. The method of claim 13, wherein the sensor data further comprise roll angular velocity data and pitch angular velocity data further utilized to generate the current road profile, the vertical velocity data, and the longitudinal velocity data, and wherein the method further comprises:

normalizing, by the data processing system, the roll angular velocity data and the pitch angular velocity data associated with the longitudinal velocity data to the predetermined velocity; and generating, by the data processing system, the current road profile of the ground based on the sensor data comprising the longitudinal velocity data, the normalized vertical velocity data, the normalized roll angular velocity data, the normalized pitch angular velocity data, and the plurality of vertical displacement signals.

17. The method of claim 13, further comprising:

determining, by the data processing system, a trajectory of the vehicle based on location data of the vehicle received from the one or more sensors;

determining, by the data processing system, based on the first location of the vehicle and the trajectory of the vehicle, the vehicle approaches a plurality of landmarks corresponding to the plurality of locations; and retrieving, by the data processing system, via a map manager, the historical road profile of the ground comprising the plurality of landmarks, the historical road profile and the plurality of landmarks generated by a plurality of vehicles using second sensor data.

18. The method of claim 13, wherein the historical road profile of the ground comprises a plurality of landmarks comprising a first landmark associated with the current location of the vehicle and a second landmark located a predetermined distance from the first landmark, the second landmark associated with the historical road profile at a next location, wherein each landmark of the plurality of landmarks comprises a location index and a lane identifier identifying a lane of the vehicle, wherein the lateral deviation identifies a distance of the vehicle from a center of the lane and the lane occupied by the vehicle, wherein the method further comprises providing, by the data processing system, responsive to determining the match between the historical road profile and the current road profile, the indication of the current location of the vehicle comprising the location index and the lane identifier to an interface of the vehicle to cause the interface to display the vehicle at the current location and the lane, and wherein the method further comprises:

determining, by the data processing system, using the longitudinal velocity data received from the one or more sensors of the vehicle, a travel distance of the vehicle from the current location, the travel distance indicative of the vehicle approaching the second landmark at the predetermined distance from the first landmark; and providing, by the data processing system, the historical vertical displacements of the historical road profile at the second landmark to a controller of the vehicle to cause the controller to control a component of the vehicle based on the historical vertical displacements of the historical road profile at the second landmark.

19. The method of claim 13, wherein the historical road profile of the ground comprises a plurality of landmarks, wherein each landmark of the plurality of landmarks is separated by a predetermined distance, wherein the method further comprises:

generating, by the data processing system, responsive to the vehicle at the predetermined distance from the current location associated with a first landmark, a second landmark associated with a second plurality of vertical displacement signals received from the one or more sensors, the second landmark located at the predetermined distance subsequent to the current location; and updating, by the data processing system, using the second plurality of vertical displacement signals at the second landmark, the plurality of landmarks with the second landmark and the historical vertical displacements of the historical road profile at the second landmark.

20. The method of claim 13, wherein the historical road profile of the ground comprises a plurality of landmarks, wherein the second location is associated with a first landmark of the plurality of landmarks, wherein determining the match, and wherein the method further comprises:

comparing, by the data processing system, the historical vertical displacements of the historical road profile to the plurality of vertical displacement signals of the current road profile at the first landmark that aligns with the lateral deviation;

determining, by the data processing system, a score indicative of similarities between the historical road profile and the current road profile at the first landmark that aligns with the lateral deviation; and updating, by the data processing system, responsive to the score satisfying a similarity threshold, the historical vertical displacements of the historical road profile at the first landmark using the plurality of vertical displacement signals received at the first landmark; or removing, by the data processing system, responsive to the score not satisfying the similarity threshold, the first landmark from the plurality of landmarks of the historical road profile.

* * * * *